(12) United States Patent
Inoue et al.

(10) Patent No.: US 7,256,404 B2
(45) Date of Patent: Aug. 14, 2007

(54) RADIATION DETECTING APPARATUS, SCINTILLATOR PANEL, AND RADIOGRAPHING SYSTEM

(75) Inventors: Masato Inoue, Kumagaya (JP); Yoshihiro Ogawa, Hachioji (JP); Satoshi Okada, Zama (JP); Tomoyuki Tamura, Yokohama (JP); Shinichi Takeda, Honjo (JP); Kazumi Nagano, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 11/200,025

(22) Filed: Aug. 10, 2005

(65) Prior Publication Data

US 2006/0033032 A1 Feb. 16, 2006

(30) Foreign Application Priority Data

Aug. 10, 2004 (JP) .............................. 2004-233424
Aug. 5, 2005 (JP) .............................. 2005-227953

(51) Int. Cl.
*G01T 1/20* (2006.01)

(52) U.S. Cl. .............................................. 250/370.11

(58) Field of Classification Search ............ 250/370.11
See application file for complete search history.

(56) References Cited

U.S. PATENT DOCUMENTS

| | | | |
|---|---|---|---|
| 4,585,944 A * | 4/1986 | Teraoka ................... | 250/484.4 |
| 5,107,125 A * | 4/1992 | Powell et al. ............. | 250/483.1 |
| 6,278,118 B1 | 8/2001 | Homme et al. ........ | 250/370.11 |
| 6,608,312 B1 * | 8/2003 | Okada et al. .......... | 250/370.11 |
| 6,777,690 B2 | 8/2004 | Homme et al. .......... | 250/483.1 |
| 7,067,817 B2 * | 6/2006 | Suganuma et al. .... | 250/370.11 |
| 2002/0017613 A1 | 2/2002 | Homme et al. ........ | 250/370.11 |
| 2006/0033031 A1 | 2/2006 | Takeda et al. ......... | 250/370.11 |
| 2006/0033040 A1 | 2/2006 | Okada et al. ............ | 250/484.2 |

FOREIGN PATENT DOCUMENTS

| | | |
|---|---|---|
| WO | WO 99/66351 | 12/1999 |
| WO | WO 00/63722 | 10/2000 |

OTHER PUBLICATIONS

Thomas Flanagan, "Re-evaluating Hot Melt Adhesives," *Adhesive Age*, vol. 9, No. 3, pp. 28-31 (1966).

* cited by examiner

*Primary Examiner*—Constantine Hannaher
(74) *Attorney, Agent, or Firm*—Fitzpatrick, Cella, Harper & Scinto

(57) ABSTRACT

A radiation detecting apparatus having: a substrate; a phosphor layer which is formed on a principal plane of the substrate and converts a wavelength of a radiation; and a phosphor protective member including a phosphor protective layer which covers the phosphor layer and is adhered to the substrate, wherein the phosphor protective layer is made of a hot melt resin and an upper surface and a side surface of the phosphor layer and at least a part of at least one side surface of the substrate are covered with the phosphor protective layer. Thus, a moisture-proofing effect for penetration of the moisture from an interface between the phosphor layer and the substrate on the side surface side of the substrate can be improved. Further, by using the hot melt resin for the phosphor protective layer, simplification of manufacturing steps, remarkable reduction in the number of working steps, and remarkable reduction in costs of a product can be accomplished.

22 Claims, 16 Drawing Sheets

RADIATION DETECTING APPARATUS, SCINTILLATOR PANEL, AND RADIOGRAPHING SYSTEM

BACKGROUND OF THE INVENTION

1. Field of the Invention

The invention relates to a radiation detecting apparatus, a scintillator panel, and their manufacturing method and system and, more particularly, to a radiation detecting apparatus, a scintillator panel, and their manufacturing method and system which are used for a medical diagnosing apparatus, a non-destructive inspecting apparatus, and the like. In the present specification, explanation will be made on the assumption that electromagnetic waves such as X-ray, α-ray, β-ray, γ-ray, and the like are also incorporated in the purview of the radiation.

2. Related Background Art

In recent years, digital radiation detecting apparatuses each obtained by laminating, at least, a phosphor layer which emits light by irradiating an X-ray onto the surface of photoelectric conversion elements formed on a flat surface of a large area have been put on the market.

Among those digital radiation detecting apparatuses, a sharp apparatus of a high sensitivity has been disclosed in U.S. Pat. No. 6,278,118 or WO9966351A1. As such a digital radiation detecting apparatus, there has been known a photodetector (also referred to as a "sensor panel") comprising a photoelectric conversion element unit in which electric elements such as a plurality of photosensors and TFTs (Thin film transistors) and the like are two-dimensionally arranged. There has been known a radiation detecting apparatus (also referred to as a "direct evaporation deposition type", a "direct type", or the like) in which a phosphor layer serving as a wavelength converter for converting a radiation into light which can be detected by the photoelectric conversion element is directly formed on such a photodetector.

As disclosed in WO200063722A1, the radiation detecting apparatus (also referred to as a "laminating type", an "indirect type", or the like) in which a scintillator panel obtained by forming the phosphor layer onto a supporting substrate is laminated onto the photodetector has also been known.

As a conventional typical sensor panel, a sensor panel disclosed in U.S. Pat. No. 6,278,118 is shown in FIG. 31. In FIG. 31, reference numeral 201 denotes a sensor substrate having a photosensor and a TFT; 202 a protective layer of the sensor; 203 a phosphor layer of a columnar structural crystal for converting the radiation into light according thereto; 204 a polyparaxylilene film (phosphor protective layer) for protecting the phosphor layer against the moisture; 205 a reflection layer made of a metal film for reflecting the light from the phosphor layer; and 206 a polyparaxylilene film for further improving moisture resistance. The metal film is a thin film and is evaporation deposited by a CVD method or the like.

As another conventional technique, the sensor panel disclosed in WO9966351A1 is shown in FIG. 32. In FIG. 32, reference numeral 301 denotes a sensor substrate having a photosensor and a TFT; 302 a phosphor layer of a columnar structural crystal for converting the radiation into light according thereto; 303 a polyparaxylilene film (phosphor protective layer) for protecting the phosphor layer against the moisture; 304 an $SiO_2$ film for improving the moisture resistance; and 305 a polyparaxylilene film for further improving the moisture resistance. The polyparaxylilene film is evaporation deposited by the CVD method in a film forming evaporation depositing room.

The following points are required for the sensor panel used for such an object as mentioned above.

First, in the case of using the phosphor layer having the columnar crystalline structure made of alkali halide such as CsI:Na, CsI:Tl, and the like formed by evaporation deposition, the moisture resistance is called into question to avoid deliquescence by the moisture in the phosphor layer. The reason why the columnar crystalline structure is used as a phosphor layer is to suppress scattering or attenuation of the converted light in the columnar crystalline structure and efficiently guide the converted light to the sensor panel.

However, since the phosphor layer having the columnar crystalline structure is a hygroscopic material, there is such a problem that if it absorbs the moisture, the crystal deliquesces and the columnar crystals are joined with each other, so that the inherent light propagation is disturbed and the resolution is remarkably deteriorated.

In FIG. 32, the moisture proof in the polyparaxylilene films 303 and 305 and the $SiO_2$ film 304 is disclosed. However, in any of the above films, the CVD method or a sputtering method is used as its film forming method.

In the phosphor layer having the columnar crystalline structure made of alkali halide such as CsI:Na, CsI:Tl, and the like formed by the evaporation deposition, there is a case where an abnormal growth (splash) defect occurs when the phosphor layer is formed. Particularly, in the radiation detecting apparatus for radiographing a human body, a thickness of 400 μm or more is necessary as a thickness of phosphor layer. In this instance, there is a case where an abnormal growing portion becomes a projective portion whose diameter is equal to 300 μm or more and whose height is equal to 20 μm or more. Further, there is a case where a doughnut-shaped concave portion having a depth of 20 μm or more is formed around the projective abnormal growing portion. The present inventors et al. have found out that a thickness of 20 μm or more is necessary as a thickness of phosphor protective layer in order to cover the abnormal growth defect portion of the phosphor layer comprising such a projective portion and a concave portion and satisfy the moisture-proofing function.

However, since the phosphor protective layer using the organic film made of polyparaxylilene as disclosed in the foregoing related art is formed by the CVD method, a film forming speed of the phosphor protective layer is equal to about 100 to 2000 Å/min and slow. Therefore, a time of 2000 to 100 minutes is necessary as a film forming time to form the phosphor protective layer of 20 μm and there is such a problem that the mass productivity is low. Further, since there are disadvantages in terms of the number of steps and costs such as material costs or the like, such a phosphor protective layer is an obstacle to reduction of costs of a product.

If the phosphor protective layer comprising the organic film made of polyparaxylilene to be used for a radiation image pick-up device of a large area (for example, 43 cm×43 cm) such as an X-ray digital camera is formed by the CVD method, inplane film thickness distribution of the phosphor protective layer increases. When a reflection layer is formed on the surface of the phosphor protective layer opposite to the phosphor, the light emitted by the phosphor layer is reflected by the reflection layer and a length of optical path of the reflection light beam entering the photoelectric conversion element is changed due to the film thickness distribution of the phosphor protective layer. Thus, since the reflecting direction of the light differs depending on the location, such a problem that the resolution deteriorates occurs.

Further, in the CVD film made of paraxylilene or the like, adhesion to the sensor protective film of the photoelectric conversion element is small, a resin to cover the periphery of the phosphor protective layer is necessary, and the costs rise.

As another requesting item, since the sensor panel converts the small amount of light into the electric signal, a high S/N ratio is required. Generally, the X-ray generating apparatus is positioned near the sensor panel in the X-ray radiographing room, there is a risk that an electromagnetic wave generated from the X-ray generating apparatus is space-propagated, enters the sensor panel from the front and rear surfaces, and is multiplexed as electric noises into the signal.

SUMMARY OF THE INVENTION

To solve the above problems, according to the invention, there is provided a radiation detecting apparatus comprising: a substrate; a phosphor layer which is formed on a principal plane of the substrate and converts a wavelength of a radiation; and a phosphor protective layer which covers the phosphor layer and is adhered to the substrate, wherein the phosphor protective layer is made of a hot melt resin and arranged so as to cover an upper surface and a side surface of the phosphor layer. The phosphor protective layer has a portion of which thickness is made smaller by a pressing adhesion process at a peripheral region of said phosphor layer.

According to the invention, there is provided a scintillator panel comprising: a supporting member; a phosphor layer which is arranged on the supporting member and converts a wavelength of a radiation; and a phosphor protective layer which covers the phosphor layer and is adhered to the supporting member, wherein the phosphor protective layer is made of a hot melt resin and is arranged so as to cover an upper surface and a side surface of the phosphor layer. The phosphor protective layer has a portion of which thickness is made smaller by a pressing adhesion process at a peripheral region of said phosphor layer.

According to the invention, a moisture-proofing effect for the penetration of the moisture from an interface between the phosphor layer and the substrate on the side of the side surface of the substrate can be improved.

Further, by using the hot melt resin as a phosphor protective layer, simplification of manufacturing steps, remarkable reduction of the number of working steps, and remarkable decrease in costs of a product can be accomplished.

DETAILED DESCRIPTION OF THE PREFERRED EMBODIMENTS

Radiation detecting apparatuses according to embodiments of the invention will be described hereinbelow.

First Embodiment

Figure 1:
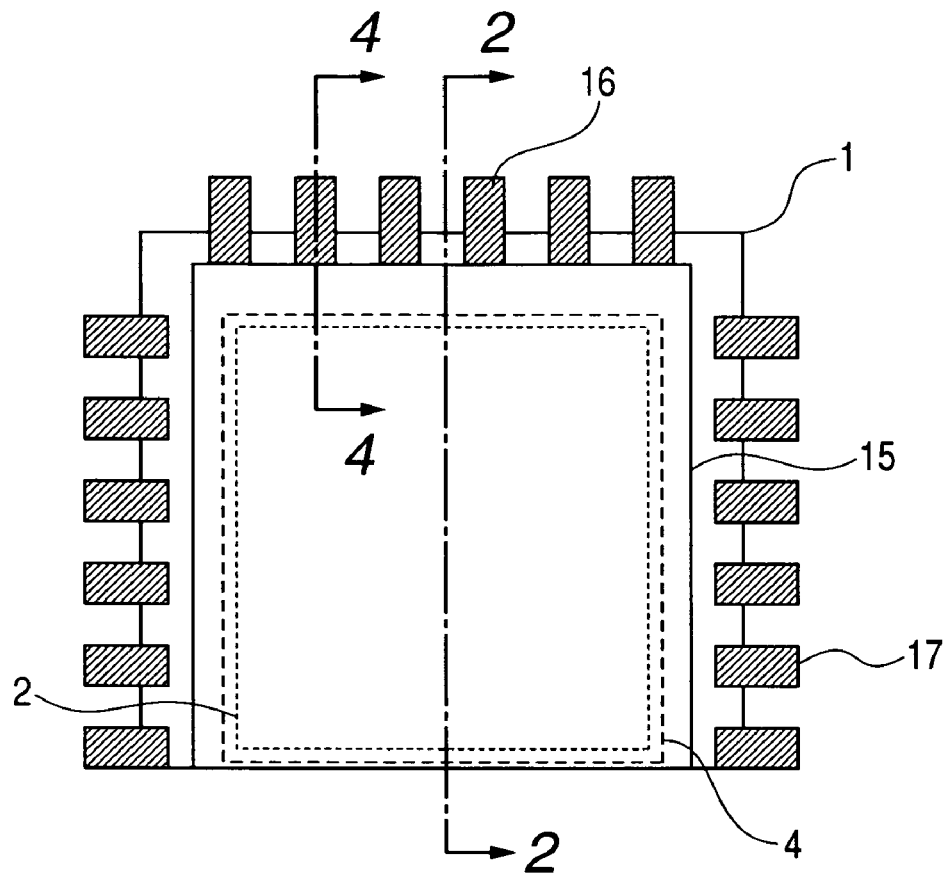
FIG. 1 is a schematic constructional plan view of a radiation detecting apparatus according to the first embodiment of the invention.
Figure 2:
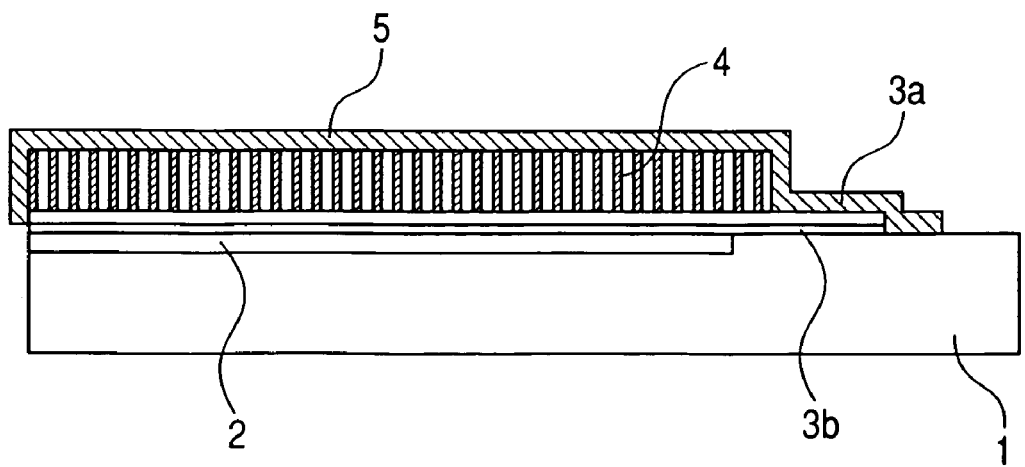
FIG. 2 is a schematic cross sectional view of the radiation detecting apparatus according to the first embodiment of the invention.
Figure 3:
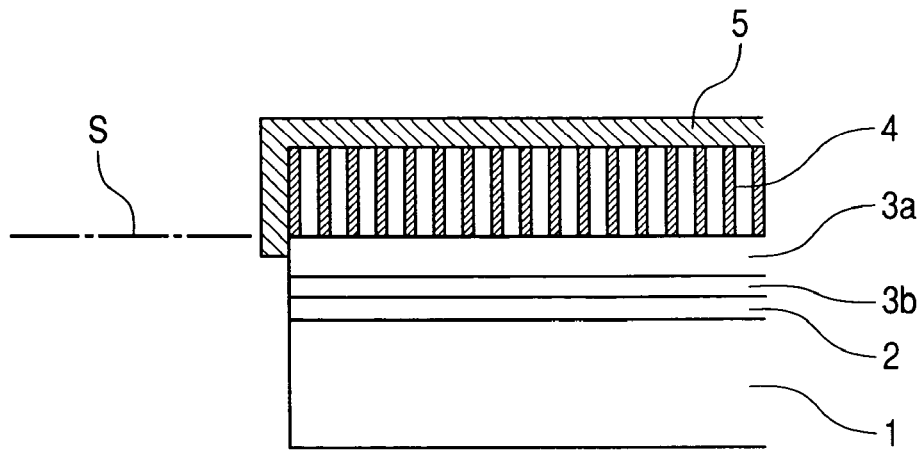
FIG. 3 is a schematic cross sectional view of the radiation detecting apparatus according to the first embodiment of the invention.
Figure 4:
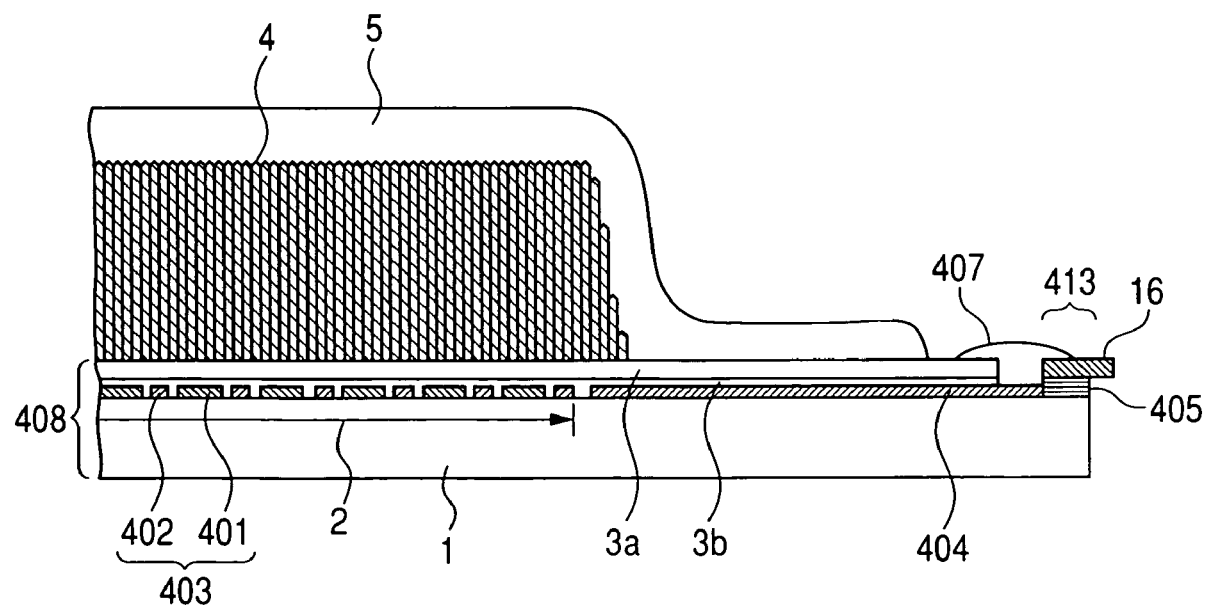
FIG. 4 is a schematic cross sectional view of the radiation detecting apparatus according to the first embodiment of the invention.

FIG. 1 is a schematic plan view of the radiation detecting apparatus of the direct evaporation deposition type according to the first embodiment of the invention. FIG. 2 is a cross sectional view taken along the line 2-2 in FIG. 1. FIG. 3 is a partially enlarged diagram of FIG. 2. FIG. 4 is a cross sectional view taken along the line 4-4 in FIG. 1. In FIGS. 1 to 4, reference numeral 1 denotes a substrate such as glass or the like; 401 photoelectric conversion elements; and 402 wirings. A photoreceiving unit 403 is constructed by the photoelectric conversion elements 401, the wirings 402, and thin film transistors (TFTs). Reference numeral 404 denotes an electrical connecting unit (lead-out wiring); 3b a sensor protective layer; 3a a phosphor underlying layer; and 405 a wiring connecting unit. A photodetector (sensor panel) 408 is constructed by the component elements 1, 401, 402, 404, 3b, 3a, and 405. A connecting unit of the electrical connecting unit 404 of the sensor panel and a wiring member 16 (or 17) is an external connecting terminal unit 413. Reference numeral 4 denotes a phosphor layer (its outer peripheral portion is shown by a broken line in FIG. 1); 5 a phosphor protective layer; 16 the wiring members each for extracting an electric signal to the outside; 17 the wiring members each for inputting a signal to drive the sensor; 407 a sealing member; 2 a sensor area; and 15 an outer peripheral portion of the phosphor protective layer.

As shown in FIG. 2, the phosphor layer 4 is coated with the phosphor protective layer 5 made of a hot melt resin. As shown in FIG. 3, one end portion of the phosphor protective layer 5 made of the hot melt resin exceeds an upper surface (interface with the phosphor layer 4) S of the phosphor underlying layer 3a of the sensor area 2 and covers the side surface of the phosphor underlying layer 3a. The other end portion of the phosphor protective layer 5 is formed so as to cover the phosphor underlying layer 3a. As mentioned above, by covering the upper surface and the side surface of the phosphor layer 4 and the interface end portion between the phosphor layer 4 and the phosphor underlying layer 3a by the phosphor protective layer 5, the penetration of the moisture into the phosphor layer 4 from the outside can be prevented. Naturally, the phosphor protective layer 5 can be also formed until it covers a part or all of the sensor protective layer 3b. Further, there is also a case where the phosphor underlying layer 3a is not formed but the phosphor layer 4 is formed on the sensor protective layer 3b. In such a case, the phosphor protective layer 5 is formed so as to cover a part or all of the sensor protective layer 3b.

As shown in FIG. 1, among four sides of the sensor substrate, an extracting or driving drive of the electric signal is not arranged to one lower side. According to the sensor having such a shape, on the one lower side, since the phosphor layer and the photoelectric conversion elements can be formed up to the end portions, it is suitable to the case where an end of the sensor is come into contact with the patient and he is radiographed. For example, the apparatus is suitably used for mammography to inspect the presence or absence of a breast cancer.

Figure 5:
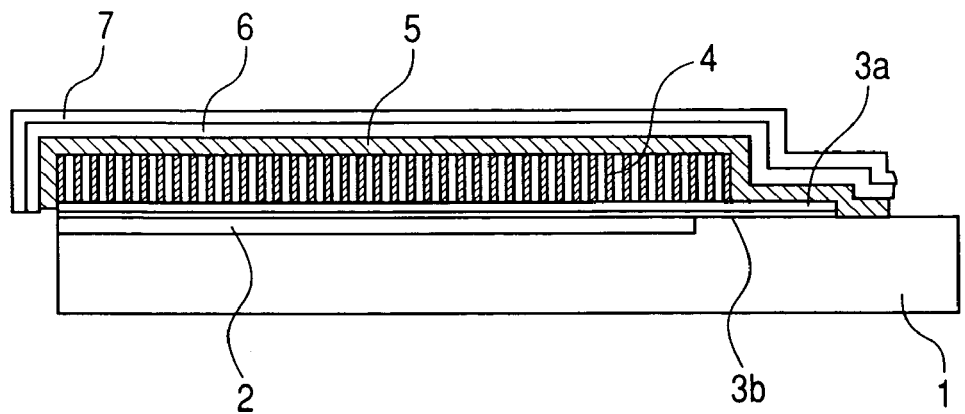
FIG. 5 is a schematic cross sectional view of the radiation detecting apparatus according to the first embodiment of the invention.

FIG. 5 is a diagram showing a modification of the first embodiment of the invention and is a cross sectional view taken along the line 2-2 in FIG. 1. In FIG. 5, the phosphor layer 4 is covered with a phosphor protective member comprising the phosphor protective layer 5, a reflection layer 6, and a reflection layer protective layer 7. Reference numeral 15 denotes the outer peripheral portion of the phosphor protective member. Also in this modification, by covering the upper surface and the side surface of the phosphor layer 4 and the interface end portion between the phosphor layer 4 and the phosphor underlying layer 3a with the phosphor protective layer 5 of the phosphor protective member, the penetration of the moisture from the outside can be prevented.

The photoreceiving unit comprising the photoelectric conversion elements, the wirings, and the TFTs is formed on the substrate 1. Glass, heat-resisting plastics, and the like can be preferably used as a material of the substrate 1.

The photoelectric conversion element 401 converts the light converted from the radiation by the phosphor layer 4 into charges. For example, a material such as amorphous silicon or the like can be used for the photoelectric conversion element 401. A construction of the photoelectric conversion element 401 is not particularly limited and an MIS-type sensor, a PIN-type sensor, a TFT-type sensor, or the like can be properly used as a photoelectric conversion element 401.

The wirings 402 denote bias wirings for applying a voltage (Vs) to a part of the signal wirings or the photoelectric conversion element. The electrical connecting unit 404 shows the signal wirings or drive wirings. The signal which was photoelectrically converted by the photoelectric conversion element 401 is read out by the TFT and outputted to the signal processing circuit through the signal wirings. Gates of the TFTs arranged in the row direction are connected to the drive wirings every row. The TFTs are selected every row by a TFT driving circuit. The signal processing circuit and the TFT driving circuit are provided out of the substrate 1 and connected to the photoelectric conversion element 401 and the TFTs through the electrical connecting unit 404, the wiring connecting unit 405, and the wiring members 16 and 17.

The sensor protective layer 3b covers the photoreceiving unit 403 (sensor area 2) and protects it. It is preferable to use an inorganic film made of SiN, $SiO_2$, or the like as a sensor protective layer 3b. The phosphor underlying layer 3a is provided on the sensor protective layer 3b. It is preferable to use a heat-resisting resin made of an organic substance such as polyimide, paraxylilene, or the like as a material of the phosphor underlying layer 3a. For example, a thermosetting polyimide resin or the like can be used. The sensor protective layer 3b and the phosphor underlying layer 3a have a function of protecting the photoelectric conversion elements. The phosphor underlying layer 3a has a function of flattening the surface of the sensor panel 408. To improve the adhesion with the phosphor layer 4, the surface of the phosphor underlying layer 3a can be also properly subjected to an activating process such as an atmospheric pressure plasma process or the like.

The phosphor layer 4 converts the radiation into the light of a wavelength which can be sensed by the photoelectric conversion element 401 and it is preferable to use phosphor having a columnar crystalline structure. According to phosphor having the columnar crystalline structure, since the generated light propagates in the columnar crystal, light scattering is small and a resolution can be improved. However, a material other than phosphor having the columnar crystalline structure can be also used for the phosphor layer 4. A material containing alkali halide as a main component is used as a material of the phosphor layer 4 having the columnar crystalline structure. For example, CsI:Tl, CsI:Na, or CsBr:Tl is used. As its manufacturing method, for example, in the case of using CsI:Tl, the phosphor layer 4 can be formed by simultaneously evaporation-depositing CsI and TlI.

The phosphor protective layer 5 has a moisture-proof protecting function of preventing the penetration of the moisture from the outside air and a shock protecting function of preventing the structure from being destroyed by a shock. It is preferable to set a thickness of phosphor protective layer 5 to 20 to 200 μm. When the thickness is equal to or less than 20 μm, the surface roughness of the phosphor layer 4 and the splash defect cannot be perfectly covered and there is a risk of deterioration of the moisture-proof protecting function. On the contrary, if the thickness exceeds 200 μm, the scattering of the light generated in the phosphor layer 4 and the scattering of the light reflected by the reflection layer increase in the phosphor protective layer 5, so that there is a risk of deterioration of the resolution of an obtained image and deterioration of an MTF (Modulation Transfer Function). The invention is characterized in that the hot melt resin is used for the phosphor protective layer. The phosphor protective layer 5 using the hot melt resin will be specifically explained hereinafter.

The reflection layer 6 has such a function that, in the light converted and generated by the phosphor layer 4, the light which has progressed in the direction opposite to the photoelectric conversion element 401 is reflected and guided to the photoelectric conversion element 401, thereby improving light using efficiency. The reflection layer 6 also has such a function of shutting off the external light other than the light generated in the phosphor layer 4, thereby preventing noises from entering the photoelectric conversion element 401. The reflection layer 6 also has an electromagnetic shielding function. It is preferable to use a metal foil or a thin metal film as a reflection layer 6. It is preferable to set a thickness of reflection layer 6 to 1 to 100 μm. When the thickness is less than 1 μm, it is liable to cause a pin hole defect when the reflection layer 6 is formed and light shielding performance is low. If the thickness exceeds 100 μm, an absorption amount of the radiation is large and there is a risk of an increase in dosage of exposure of the radiation of a radiographed person. There is also a risk that it is difficult to cover the step-forming portion between the phosphor layer 4 and the surface of the sensor panel 408 without a gap. A metal material such as aluminum, gold, copper, aluminum alloy, or the like which is not particularly limited can be used as a material of the reflection layer 6. Aluminum or gold is preferable as a material having high reflecting characteristics.

The reflection layer protective layer 7 has a function of preventing the reflection layer 6 from being destroyed by a shock and from being corroded by the moisture and it is preferable to use a resin film. A film material such as polyethylene terephthalate, polycarbonate, vinyl chloride, polyethylene naphthalate, polyimide, or the like can be used as a material of the reflection layer protective layer 7. It is preferable to set a thickness of reflection layer protective layer 7 to 10 to 100 μm.

The wiring connecting unit 405 is a member to electrically connect the electrical connecting unit 404 and the wiring member 16 (or 17) and is electrically connected to the wiring member 16 (or 17) by an anisotropic conductive adhesive agent or the like.

The wiring member 16 is a member on which IC parts and the like for reading out the electric signal converted by the photoelectric conversion element 401 have been mounted and a TCP (Tape Carrier Package) or the like is preferably used for the wiring member 16. The wiring member 17 is a member on which driver IC parts and the like for inputting a signal to drive the sensor have been mounted and the TCP (Tape Carrier Package) or the like is preferably used for the wiring member 17.

The sealing member 407 has a function of preventing the wiring members 16 and 17 and the electrical connecting unit 404 from being corroded by the moisture, a function of preventing them from being destroyed by a shock, and a function of preventing the static electricity which becomes a cause of destruction of the photoreceiving unit 403 which is caused upon manufacturing of the apparatus.

The phosphor protective layer 5 made of the hot melt resin will be described in detail hereinbelow.

It is required that the phosphor protective layer 5 have the following functions 1) to 12) in order to protect the phosphor layer, particularly, the phosphor layer 4 having the columnar crystalline structure.

1) Has a shock resistance for preventing the destruction by the shock from the outside.
2) Has radiation permeability for preferably transmitting the radiation from a radiation source.
3) Has light transmittance for preferably transmitting the light generated in the phosphor layer 4.
4) Has high adhesion with the surface of the phosphor layer, sensor panel, or supporting member.
5) Has inplane uniformity of the layer thickness for preventing a deterioration in resolution due to an optical path difference of the transmitted light.
6) Has absorbing performance for absorbing stress that is caused by a difference between coefficients of thermal expansion of the substrate and the reflection layer.
7) Has a film forming (forming) temperature which does not exert an adverse influence on the phosphor layer and the photoreceiving unit.
8) Has a high film forming (forming) speed which provides high mass productivity.
9) Has high moisture-proofing performance (moisture resistance, water non-permeability) for preventing the penetration of the moisture from the outside air.
10) Does not include a water, a polar solvent, a solvent, or the like which dissolves the columnar crystal.
11) Has a viscosity which does not cause a remarkable resolution deterioration due to the penetration between the columnar crystals.
12) Has such characteristics that it is insoluble or is slightly soluble in a disinfecting solvent such as ethanol or the like of medical instruments.

It is preferable to use the hot melt resin as a material of the phosphor protective layer 5 which satisfies the abovementioned functions. It is defined that the hot melt resin is a solid which does not contain the water and the solvent at a room temperature and is an adhesive resin completely made of a non-volatile thermoplastic material (refer to Thomas. P. Flanagan, "Adhesive Age", 9, No. 3, 28 (1966)).

The hot melt resin is melted when the resin temperature rises and is solidified when the resin temperature decreases. In the heat melting state, the hot melt resin has the adhesive property with other organic materials and inorganic materials. At an ordinary temperature, the hot melt resin enters a solid state and does not have the adhesive property. Since the hot melt resin does not contain the polar solvent, solvent, and water, even if the hot melt resin is come into contact with the phosphor layer (for example, phosphor layer having the columnar crystalline structure made of alkali halide), it does not dissolve the phosphor layer. Therefore, the hot melt resin can be used as a phosphor protective layer. The hot melt resin differs from an adhesive resin layer of a solvent volatile hardening type formed by melting a thermoplastic resin into the solvent and coating by a solvent coating method. The hot melt resin also differs from an adhesive resin (represented by epoxy or the like) of a chemical reacting type which is formed by a chemical reaction.

A material of the hot melt resin is classified by a kind of base polymer (base material) as a main component and a polyolefin system, a polyester system, a polyamide system, or the like can be used as a material of the hot melt resin. As mentioned above, as a phosphor protective layer 5, it is important that the moisture-proofing performance is high and the light transmittance for transmitting the visible light generated from phosphor is high. It is preferable to use a polyolefin system resin or a polyester system resin as a hot melt resin which satisfies the moisture-proofing performance that is required for the phosphor protective layer 5. Particularly, the polyolefin resin whose coefficient of moisture absorption is low is preferable. The polyolefin system resin is preferable as a resin whose light transmittance is high. Therefore, the hot melt resin made of the polyolefin system resin as a base is more preferable as a phosphor protective layer 5.

As will be understood in the embodiment, which will be described hereinafter, in a peripheral region where the phosphor layer 4 with which the phosphor underlying layer 3a and the phosphor protective layer 5 are come into contact has been formed, it is desirable to execute the heat sealing (heat pressing adhesion) by the hot pressing process so as to surround the area where the phosphor layer 4 has been formed. For such a purpose as mentioned above as well, it is preferable to use the hot melt resin of the polyolefin system, polyester system, polyamide system, or the like having such a nature that when the temperature rises, the hot melt resin is melted and adhered to the adhering body and when the resin temperature drops, the hot melt resin is solidified.

It is required that the forming temperature of the phosphor protective layer 5 is set to the temperature which does not exercise an adverse influence on the phosphor layer 4 or the photoelectric conversion element 401, wiring 402, and TFT (not shown) as a photoreceiving unit 403. The forming temperature of the hot melt resin which is used for the phosphor protective layer 5 depends on a melting start temperature of the resin. The melting start temperature of the hot melt resin is preferably set to a value within a range from 70° C. or more to 150° C. or less. If the melting start temperature is lower than 70° C., the heat resistance and the preservation durability of the product are low. If it exceeds 150° C., a temperature over 150° C. is necessary as a temperature at which the resin is adhered onto the surface of the phosphor layer 4. The difference between the coefficients of thermal expansion of the substrate 1 made of glass or the like and the phosphor protective layer 5 made of the hot melt resin increases and a warp of the substrate 1 increases when the phosphor protective layer 5 is formed on the substrate 1, so that it is unpreferable.

In the polyester system resin, a large quantity of plasticizer is necessary to provide a coefficient of viscosity upon melting at which the forming and adhering process can be executed at a temperature in the range from 70 to 150° C. There is a risk that such a plasticizer is diffused into the phosphor layer 4 and it results in deterioration or the like of the phosphor layer 4. Therefore, when considering a preferable range of the melting start temperature range of the hot melt resin, the polyolefin system resin material which does not need to use a large quantity of plasticizer is more preferable.

The penetration of the phosphor protective layer 5 made of the hot melt resin into the space between the columnar crystals of the phosphor layer 4 having the columnar crystalline structure depends on a coefficient of viscosity upon melting (hereinafter, also referred to as melting viscosity) of the hot melt resin. As a coefficient of viscosity upon melting which is required with respect to the penetration, it is desirable to set it to $1 \times 10^3$ Pa·s or more at a temperature in the range from 100 to 140° C. as a forming temperature of the phosphor protective layer 5 made of the hot melt resin. It is more desirable to set it to $1.5 \times 10^3$ Pa·s or more. If the coefficient of viscosity upon melting is less than $1 \times 10^3$ Pa·s, the hot melt resin penetrates between the columnar crystals of the phosphor layer 4, the light converted by the phosphor layer 4 scatters, and the resolution of the image which is detected by the photoreceiving unit 403 deteriorates.

The adhesion between the phosphor protective layer 5 made of the hot melt resin and the phosphor layer 4 and/or the phosphor underlying layer 3a depends on the coefficient of viscosity upon resin melting and tensile strength of the resin. As a coefficient of viscosity which is required with respect to the adhesion, it is desirable to set it to $1 \times 10^4$ Pa·s or less. It is more desirable to set it to $6.0 \times 10^3$ Pa·s or less. If the coefficient of viscosity upon melting exceeds $1 \times 10^4$ Pa·s, the adhesion which is necessary for the phosphor layer 4 and the phosphor underlying layer 3a is not obtained. Therefore, as a coefficient of viscosity of the hot melt resin which is used for the phosphor protective layer 5 of the invention, it is desirable to set it to a value within a range from $1 \times 10^3$ to $1 \times 10^4$ Pa·s at a temperature in the range from 100 to 140° C. It is more desirable to set it to a value within a range from $1.5 \times 10^3$ to $6.0 \times 10^3$ Pa·s.

As a tensile strength which is required with respect to the adhesion, it is desirable to set it to 40 to 300 kg/cm$^2$, preferably, 50 to 200 kg/cm$^2$. If the tensile strength is less than 40 kg/cm$^2$, there is a fear that the strength which is required as a phosphor protective layer 5 lacks. If the tensile strength exceeds 300 kg/cm$^2$, there is a fear that interlayer peel-off between the phosphor protective layer 5 and the phosphor layer 4 which is caused by the difference between the coefficients of thermal expansion of the substrate 1 and the phosphor protective layer 5 or interlayer peel-off between the phosphor layer 4 and the phosphor underlying layer 3a cannot be prevented. The interlayer peel-off also depends on a destruction elongation percentage besides the tensile strength. As a destruction elongation percentage of the hot melt resin which is used for the phosphor protective layer 5 in the invention, it is desirable to set it to 400% or more, preferably, a value within a range from 600 to 1000%.

The adhesion power depending on the coefficient of viscosity upon melting, tensile strength, and destruction elongation percentage and the melting start temperature which are required for the hot melt resin that is used for the phosphor protective layer 5 in the invention can be controlled by changing one element or a combination of two or more elements:
(1) Content of a copolymer contained in the hot melt resin.
(2) Contents of acrylic acid, acrylic acid ester, methacrylic acid, and methacrylic acid ester in the copolymer contained in the hot melt resin.
(3) Contents of an additive contained in the hot melt resin.

The copolymer contained in the hot melt resin and substances constructing various copolymers will be described hereinbelow.

In the invention, it is desirable that the hot melt resin of the polyolefin system which is preferably used for the phosphor protective layer 5 contains at least one kind, as a main component, of
A. an ethylene-vinyl acetate copolymer,
B. an ethylene-acrylic acid copolymer (EAA),
C. an ethylene-acrylic acid ester copolymer (EMA),
D. an ethylene-methacrylic acid copolymer (EMAA),
E. an ethylene-methacrylic acid ester copolymer (EMMA), and a copolymer selected from the ionomer resin.

The above five copolymers A to E will be described hereinbelow.

A. The ethylene-vinyl acetate copolymer is a copolymer of a substance having an ethylene unit —$CH_2$—$CH_2$— and a molecular structure of vinyl acetate —$CH_2$—$CH(OCOCH_3)$— and its general formula is expressed by $$-[(CH_2-CH_2)_a-CH_2-CH(OCOCH_3)_b-]_n$$

where, a, b, n: integers

It is desirable that the content ratio of vinyl acetate in ethylene is equal to 2 to 40 wt %. To increase the moisture-proofing performance of the hot melt resin, it is preferable to decrease the content ratio of vinyl acetate. To increase the adhesive strength with phosphor, it is preferable to increase the content ratio of vinyl acetate. As a hot melt resin which is used for the phosphor protective layer 5 in the invention, it is preferable that the content ratio of the ethylene-vinyl acetate copolymer is equal to 5 to 20%.

B. The ethylene-acrylic acid copolymer (EAA) is a copolymer of a substance having an ethylene unit —$CH_2$—$CH_2$— and a molecular structure of acrylic acid —$CH_2$—CHCOOH— having a structure in which a carboxyl group is contained in the structure of polyethylene at random, and its general formula is expressed by $$-[(CH_2-CH_2)_a-(CH_2-CHCOOH)_b-]_n$$

where, a, b, n: integers

It is desirable that the content ratio of acrylic acid to ethylene is equal to 4 to 20 wt %. In a manner similar to vinyl acetate, to increase the moisture-proofing performance of the hot melt resin, it is preferable to decrease the content ratio of the acrylic acid. To increase the adhesive strength with the phosphor layer, it is preferable to increase the content ratio of the acrylic acid. As a hot melt resin which is used for the phosphor protective layer 5 in the invention, it is preferable that the content ratio of the ethylene-acrylic acid copolymer is equal to 5 to 20%.

C. The ethylene-acrylic acid ester copolymer is a copolymer of a substance having the ethylene unit —$CH_2$—$CH_2$— and a molecular structure of acrylic acid ester —$CH_2$—CHCOOR— and its general formula is expressed by $$-[(CH_2-CH_2)_a-(CH_2-CHCOOR)_b-]_n$$

where, a, b, n: integers
R: one of $CH_3$, $C_2H_5$, $C_3H_7$

It is desirable that the content ratio of acrylic acid ester to ethylene is equal to 2 to 35 wt %. In a manner similar to the above, to increase the moisture-proofing performance of the hot melt resin, it is preferable to decrease the content ratio of the content ratio of the acrylic acid ester. To increase the adhesive strength with the phosphor layer, it is preferable to increase the content ratio of acrylic acid ester. As a hot melt resin which is used for the phosphor protective layer 5 in the invention, it is preferable that the content ratio of the ethylene-acrylic acid ester copolymer is equal to 8 to 25%.

D. The ethylene-methacrylic acid copolymer is a copolymer of a substance having the ethylene unit —$CH_2$—$CH_2$— and a molecular structure of methacrylic acid —$CH_2$—$CCH_3COOH$— having a structure in which the carboxyl group is contained in the structure of polyethylene at random and its general formula is expressed by $$-[(CH_2-CH_2)_a-(CH_2-CCH_3COOH)_b-]_n$$

where, a, b, n: integers

It is desirable that the content ratio of methacrylic acid in ethylene is equal to 2 to 20 wt %. In a manner similar to the above, to increase the moisture-proofing performance of the hot melt resin, it is preferable to decrease the content ratio of methacrylic acid. To increase the adhesive strength with the phosphor layer, it is preferable to increase the content ratio of methacrylic acid. As a hot melt resin which is used for the phosphor protective layer 5 in the invention, it is preferable that the content ratio of the ethylene-methacrylic acid copolymer is equal to 5 to 15%.

E. The ethylene-methacrylic acid ester copolymer is a copolymer of a substance having the ethylene unit —$CH_2$—$CH_2$— and a molecular structure of methacrylic acid ester —$CH_2$—$CCH_3COOR$— and its general formula is expressed by $$-[(CH_2-CH_2)_a-(CH_2-CCH_3COOR)_b-]_n$$

where, a, b, n: integers

It is desirable that the content ratio of methacrylic acid ester to ethylene is equal to 2 to 25 wt %. In a manner similar to the above, to increase the moisture-proofing performance of the hot melt resin, it is preferable to decrease the content ratio of methacrylic acid ester. To increase the adhesive strength with the phosphor layer, it is preferable to increase the content ratio of methacrylic acid ester. As a hot melt resin which is used for the phosphor protective layer 5 in the invention, it is preferable that the content ratio of the ethylene-methacrylic acid ester copolymer is equal to 3 to 15%.

The hot melt resin which is used for the phosphor protective layer 5 in the invention contains at least one of the foregoing five kinds of copolymers or can also contain a mixture of two or more kinds of them. In the hot melt resin of the invention, a mixture of two or more different copolymers among the same kind of copolymers, for example, the ethylene-methacrylic acid methyl copolymer and the ethylene-methacrylic acid ethyl copolymer can be also contained in the adhesive agent layer.

Hirodyne 7544 (made by Hirodyne Co., Ltd.) can be used as a hot melt resin made of the ethylene-vinyl acetate copolymer as a main component. O-4121 (made by Kurabo Industries Ltd.) can be used as a hot melt resin made of the ethylene-acrylic acid ester copolymer as a main component. W-4110 (made by Kurabo Industries Ltd.) can be used as a hot melt resin made of the ethylene-methacrylic acid ester copolymer as a main component. H-2500 (made by Kurabo Industries Ltd.) can be used as a hot melt resin made of the ethylene-acrylic acid ester copolymer as a main component. P-2200 (made by Kurabo Industries Ltd.) can be used as a hot melt resin made of the ethylene-acrylic acid copolymer as a main component. Z-2 (made by Kurabo Industries Ltd.) or the like can be used as a hot melt resin made of the ethylene-acrylic acid ester copolymer as a main component.

In the hot melt resin of the invention, it is desirable that a weight mean molecular amount of the copolymer contained in the hot melt resin lies within a range about from 5,000 to 1,000,000.

For example, a tackifier or a softener can be mentioned as an additive which is added to the hot melt resin. As a tackifier, for example, a natural resin such as rosin, polymerization rosin, hydrogenated rosin, rosin ester, or the like, its transformed material, an aliphatic compound, alicyclic compound, aromatic, a petroleum resin, a terpene resin, a terpene-phenol resin, a hydrogenated terpene resin, a cumarone resin, or the like can be mentioned. As a softener, for example, a process oil, a paraffin oil, a castor oil, polybutene, polyisoprene of a small molecular amount, or the like can be mentioned.

As a hot melt resin which is used for the phosphor protective layer 5 of the radiation detecting apparatus (particularly, radiation detecting apparatus for radiographing a human body and an animal), it is preferable to use a hot melt resin in which the function of the phosphor protective layer 5 is not lost even if alcohol for disinfection is splashed. As a hot melt resin which is insoluble or slightly soluble to ethyl alcohol as alcohol for disinfection, it is preferable that the content ratio of the additive such as a tackifier or the like in the hot melt resin is equal to 20% or less, more preferably, 10% or less. Ethanol is a solvent which is used in a hospital or the like as a use environment of the radiation detecting apparatus and there is a case where it is come into contact with the radiation detecting apparatus. The inventors have found that if an amount of component dissolved in the solvent is equal to 20% or less, a peel-off which is caused by the dissolution of the phosphor protective layer 5 does not occur.

To improve the adhesive strength between the phosphor protective layer 5 made of the hot melt resin and the phosphor layer 4 having the columnar crystalline structure, the surface of the phosphor protective layer 5 made of the hot melt resin which is come into contact with the phosphor layer 4 is reformed and a critical surface tension of this surface is set to $40 \times 10^{-3}$ $J/m^2$ or more, preferably, $45 \times 10^{-3}$ $J/m^2$ or more, thereby enabling the adhesive strength to be improved. When a content ratio of acrylic acid, acrylic acid ester, methacrylic acid, methacrylic acid ester, or the like of the copolymer is set to 20 wt % or less as compositions of the hot melt resin, the critical surface tension of the phosphor protective layer 5 made of the hot melt resin is equal to $30 \times 10^{-3}$ to $37 \times 10^{-3}$ $J/m^2$, so that the wettability to the surface of the phosphor layer 4 and that to the surface of the sensor panel 408 around such a surface deteriorate. Therefore, there is such a tendency that the adhesion among the phosphor protective layer 5, the phosphor layer 4, and the sensor panel 408 deteriorates slightly. However, the adhesion power can be improved by deforming the surface of the hot melt resin and increasing the critical surface tension.

At this time, the surface deforming method is not limited in particular and, for example, a corona discharging process, an ozone process, an alkali process, an argon plasma process, an oxygen plasma process, or the like is properly used. By executing the corona discharging process by using a corona discharging apparatus to both surfaces of the phosphor protective layer 5 made of the hot melt resin, the critical surface tension of the surface of the phosphor protective layer 5 can be improved. In the invention, the critical surface tension was measured by the method of JIS K-6768.

As an adhesion power which is required between the phosphor protective layer 5 and the sensor panel 408 in the invention, it is preferable to set it to 0.1 kg/25 mm or more in a 90° type peel-off test.

As a method of coating the surfaces (upper surface and side surface) of the phosphor layer and the side surface of the substrate with the hot melt resin as a phosphor protective layer, for example, the following methods can be given.

(1) A laminated sheet comprising a laminate of the reflection layer 6 such as metal foil, metal evaporation deposition film, or the like and the reflection layer protective layer 7 is prepared. The laminated sheet is coated with the hot melt resin. The hot melt resin surface of the manufactured hot melt resin sheet is first arranged in an upper portion of the phosphor layer of the sensor panel on which the phosphor layer has been formed and is adhered while it is pressed and heated by a roller which can be heated. By the above method, the radiation detecting apparatus as shown in FIG. 5 can be obtained. In the case of laminating the hot melt resin sheet up to the back surface of the sensor panel, the hot melt resin sheet is bent to the back surface side of the sensor panel and the hot melt resin surface is positioned to the back surface of the sensor substrate and similarly adhered while it is pressed and heated by the roller which can be heated.

(2) A hot melt resin layer is formed onto the peel-off substrate, the hot melt resin surface of the manufactured hot melt resin sheet is first arranged in the upper portion of the phosphor layer of the sensor panel on which the phosphor layer has been formed and is adhered while it is pressed and heated by the roller which can be heated. Subsequently, the residual hot melt resin sheet is bent in the edge portion of the sensor panel, and the side surface of the sensor panel and the hot melt resin sheet are adhered while they are pressed and heated by the roller which can be heated. In the case of laminating the hot melt resin sheet up to the back surface of the sensor panel, the hot melt resin sheet is bent to the back surface side of the sensor panel and the hot melt resin surface is positioned to the back surface of the sensor substrate and similarly adhered while it is pressed and heated by the roller which can be heated. After that, the peel-off substrate is peeled off. By the above method, the radiation detecting apparatus as shown in FIG. 2 can be obtained.

(3) The hot melt resin sheet described in the above method (1) is formed and bonded with a pressure by a vacuum pressing apparatus and formed on the surface of the phosphor layer. By the above method, the radiation detecting apparatus as shown in FIG. 5 can be obtained.

Figure 6A:
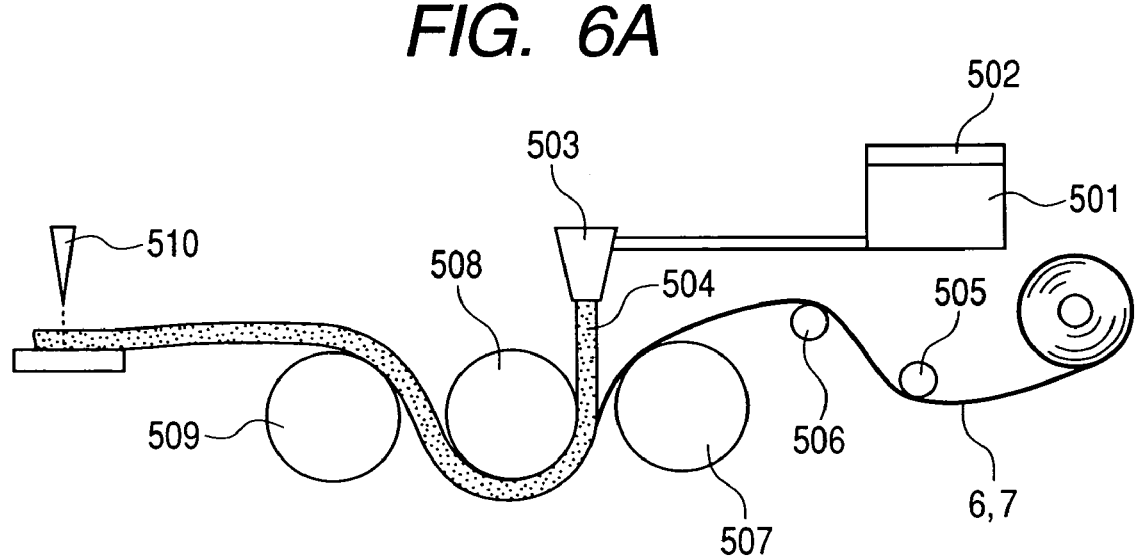
FIGS. 6A and 6B are step diagrams showing a method of covering the surface of a phosphor layer and the side surface of a substrate with a hot melt resin as a phosphor protective layer.
Figure 6B:
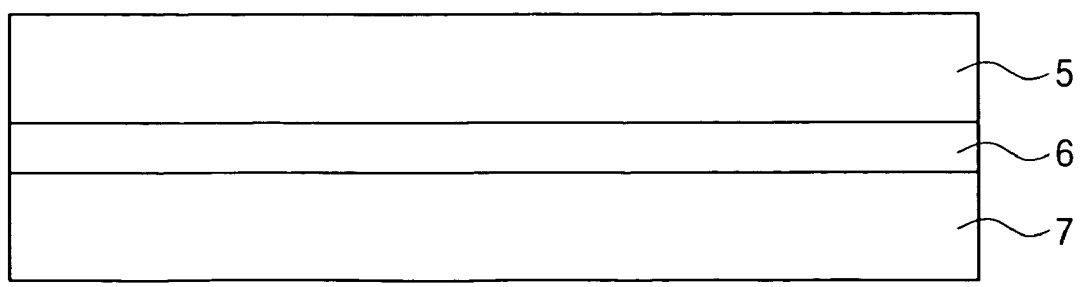

The method (1) will be described in more detail. As shown in FIGS. 6A and 6B, the melted hot melt resin is prepared in a tank 502 and a diecoater 503 and a roll-shaped laminated sheet comprising the laminate of the reflection layer 6 such as metal foil, metal evaporation deposition film, or the like and the reflection layer protective layer 7 is prepared. The upper surface of the laminated sheet whose wrinkles have been stretched by wrinkle-removing rollers 505 and 506 is coated with a hot melt resin 504 melted between molding rollers 507 and 508 by an extrusion coating method. After the obtained laminated sheet is molded by the molding roller 508, it is cooled and hardened by a cooling roller 509 and cut out to a predetermined size by cutting means 510. In this manner, the phosphor protective layer 5 made of the hot melt resin is formed on the reflection layer 6 such as metal foil, metal evaporation deposition film, or the like, thereby forming a phosphor protective sheet shown in FIG. 6B.

Figure 7:
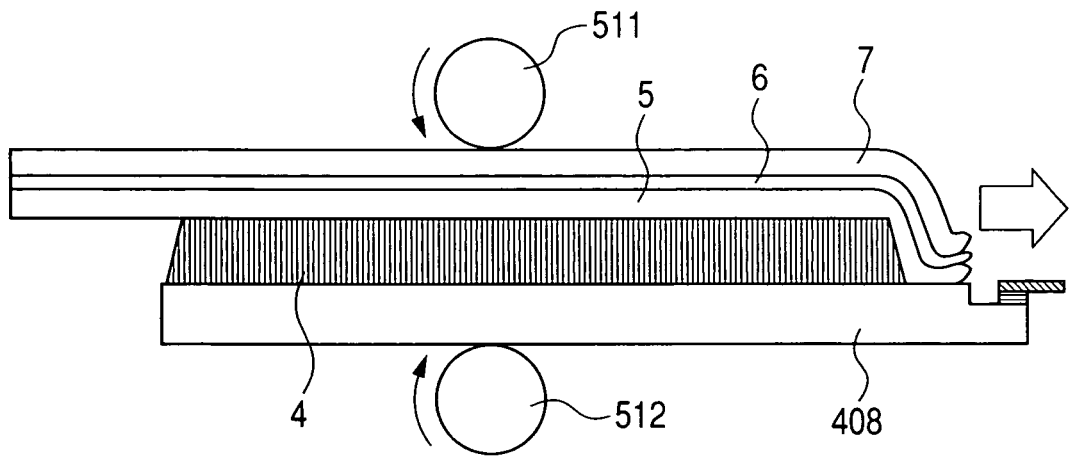
FIG. 7 is a step diagram showing a method of covering the surface of the phosphor layer and the side surface of the substrate with the hot melt resin as a phosphor protective layer.

Subsequently, as shown in FIG. 7, the obtained phosphor protective sheet is overlaid onto the phosphor underlying layer 3a and the phosphor layer 4 of the sensor panel 408 and the hot melt resin is heated and melted by a thermal laminating roller 511 to a temperature over a melting temperature of the hot melt resin. The radiation detecting apparatus is moved by using the thermal laminating roller 511 and a conveying roller 512 and the thermal laminating roller 511 is relatively moved over the phosphor layer 4 from a predetermined start position on the phosphor protective sheet on the phosphor underlying layer 3a, thereby heating and pressure-bonding the sheet from the predetermined start position to the position where the thermal laminating roller 511 faces the conveying roller 512 through the phosphor layer 4. The radiation detecting apparatus is rotated by 90° on the plane and the thermal laminating roller 511 is again relatively moved over the phosphor layer 4 from the predetermined start position on the phosphor protective sheet on the phosphor underlying layer, thereby heating and pressure-bonding the sheet from the predetermined start position to the position where the thermal laminating roller 511 faces the conveying roller 512 through the phosphor layer 4. In this manner, the phosphor protective sheet is adhered onto the phosphor layer 4 and the phosphor underlying layer 3a of the sensor panel 408. A temperature of the thermal laminating roller is adjusted to a value within a range from 90 to 180° C. A rotational speed of the thermal laminating roller is adjusted to a value within a range from 0.01 to 1 m/min. A pressing force of the thermal laminating roller is adjusted to a value within a range from 1 to 50 kg/cm$^2$.

Temperatures of the two thermal laminating rollers 511 and 512 can be made different. By changing the temperatures, the generation of a warp of the glass substrate 1 of the radiation detecting apparatus after the thermal lamination can be lightened. It is also possible to use a supporting substrate in place of the thermal laminating roller 512 and heat and pressure-bond the sheet only by the thermal laminating roller 511.

It is preferable to execute the thermal roll laminating process twice in order to improve the adhesion between the phosphor protective layer 5 and the surface of the sensor panel 408 in the step-forming portion which is caused in the portion where the phosphor layer exists and the portion where it does not exist. In the first thermal roll laminating process, the step-forming portion of one pair of two opposite sides of the quadrilateral radiation detecting apparatus is pressed by the thermal laminating rollers 511 and 512, so that the phosphor protective layer 5 and the sensor panel 408 can be sufficiently adhered. Subsequently, by rotating the radiation detecting apparatus by 90° on a plane and again executing the thermal roll laminating process, the phosphor protective layer 5 and the sensor panel 408 can be sufficiently adhered in the step-forming portion of the other pair of two opposite sides of the radiation detecting apparatus.

If it is difficult to laminate the phosphor protective layer 5 to the side surface of the phosphor underlying layer 3a of the sensor panel 408 in the thermal laminating process, it is adhered up to the side surface of the phosphor layer 4 (edge side of the sensor panel), thereafter, the residual hot melt resin sheet is bent in the edge portion of the sensor panel, and the side surface of the sensor panel and the hot melt resin sheet are adhered while they are pressed and heated by the roller which can be heated.

Figure 8:
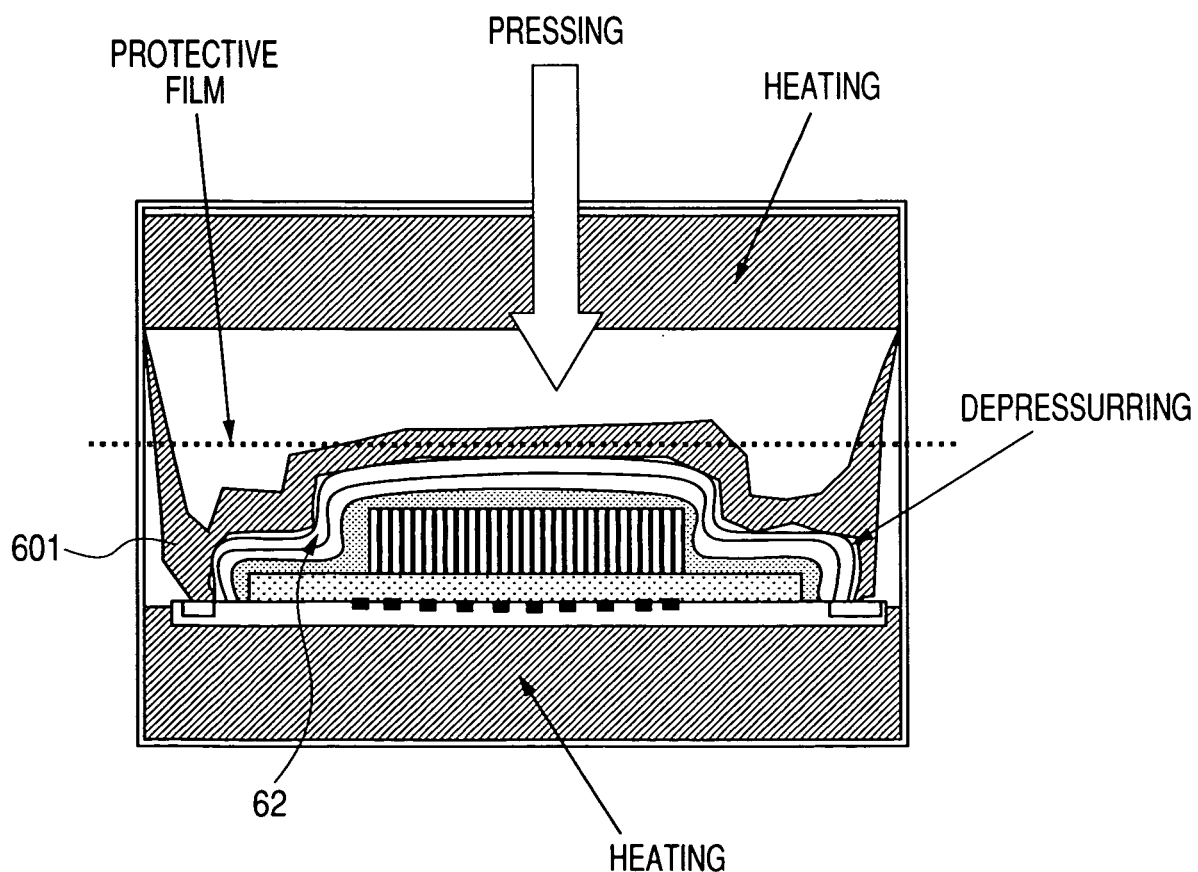
FIG. 8 is a step diagram showing a method of covering the surface of the phosphor layer and the side surface of the substrate with the hot melt resin as a phosphor protective layer.

A film forming method of the hot melt resin sheet by a vacuum pressing method is shown in FIG. 8 in order to explain the foregoing method (3) in more detail. In FIG. 8, the sensor panel 408 formed with the phosphor layer 4 is arranged on a heat pressing apparatus. A hot melt resin sheet 62 described with reference to FIGS. 6A and 6B is arranged over the phosphor layer 4. Subsequently, the peripheries of the sensor panel 408 and the hot melt resin sheet 62 are depressurized and a space on the side opposite to the phosphor protective layer 5 partitioned by a diaphragm rubber 601 is pressurized.

The hot melt resin sheet 62 is pressurized by the diaphragm rubber 601 so as to be adhered onto the surface of the phosphor layer 4 and the phosphor underlying layer 3a without a gap. Further, by heating the hot melt resin sheet for a time interval from a few seconds to a few minutes at a temperature higher than the melting start temperature of the hot melt resin by about 10 to 60° C., the hot melt resin is melted. A pressurizing pressure is adjusted to a value within a range from 1 to 50 kg/cm$^2$.

Subsequently, after the sheet is cooled, the radiation detecting apparatus is taken out of the vacuum pressing apparatus. Thus, the hot melt resin sheet is sufficiently adhered onto the surface of the phosphor layer 4 and the phosphor underlying layer 3a in the peripheral portion of the sensor area 2.

A magnitude of an influence by the electromagnetic wave of the radiation detecting apparatus differs in dependence on a distance between the radiation detecting apparatus and the electromagnetic wave generating apparatus and their directional/positional relations. Particularly, it has been known that an influence by the penetration of the electromagnetic waves from the front and rear surfaces of the sensor is large. The larger a thickness of electromagnetic shielding material is, the more an electromagnetic shielding effect is obtained. However, it is improper to extremely thicken the electromagnetic shielding material because a weight, a size, costs, and the like increase. It has been known by experience that in a general X-ray image pick-up device, if a thickness of aluminum as an electromagnetic shielding material is equal to 20 µm or more, the electromagnetic shielding effect is obtained. A generally commercially available sheet obtained by coating a polyethylene sheet with an aluminum foil can be preferably used as an electromagnetic shielding material. In the embodiment, the electromagnetic shielding material can be constructed by the phosphor protective member comprising the phosphor protective layer 5, the reflection layer 6, and the reflection layer protective layer 7.

It is considered that an electromagnetic shielding body as a metal body is subjected to charges due to various situations. In the sharp radiation detecting apparatus of the invention, a very unstable situation in which the sensor surface has been subjected to the charges can be presumed. To avoid such an unstable situation, it is desirable to drop an electric potential of the phosphor protective member, particularly, the reflection layer 6 to a fixed electric potential (for example, grounding potential) of a casing (not shown) which supports the sensor.

According to the first embodiment of the invention as mentioned above, the penetration of the moisture from the outside into the upper surface and the side surface of the phosphor layer can be prevented by the phosphor protective layer and the phosphor protective member and the stable electric signal in which noises are small can be obtained. Particularly, by covering the phosphor layer with the phosphor protective layer having the reflection layer, the electromagnetic waves which enter from the outside can be prevented. Further, by using the hot melt resin such as a polyolefin system resin, the number of manufacturing steps and the costs can be remarkably reduced as compared with the evaporation depositing steps of the moisture-proofing layer in the conventional example.

Although the phosphor protective layer 5 has been provided up to the back surface for one side where the external connecting terminal unit 413 of the sensor panel is not provided in the embodiment, the phosphor protective layer 5 can be also similarly provided for the sides where the external connecting terminal units 413 are provided. In this instance, such a process can be realized by forming an opening portion into a part of the phosphor protective layer 5, the reflection layer 6, and the reflection layer protective layer 7 in the region where the external connecting terminal units 413 are provided.

Second Embodiment

Figure 9:
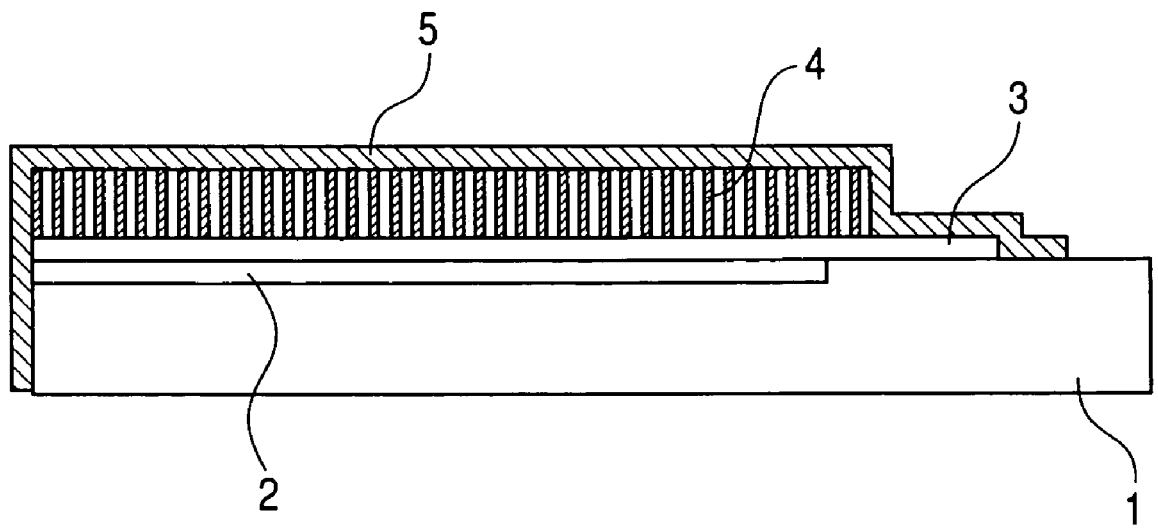
FIG. 9 is a schematic cross sectional view of a radiation detecting apparatus according to the second embodiment of the invention.
Figure 10:
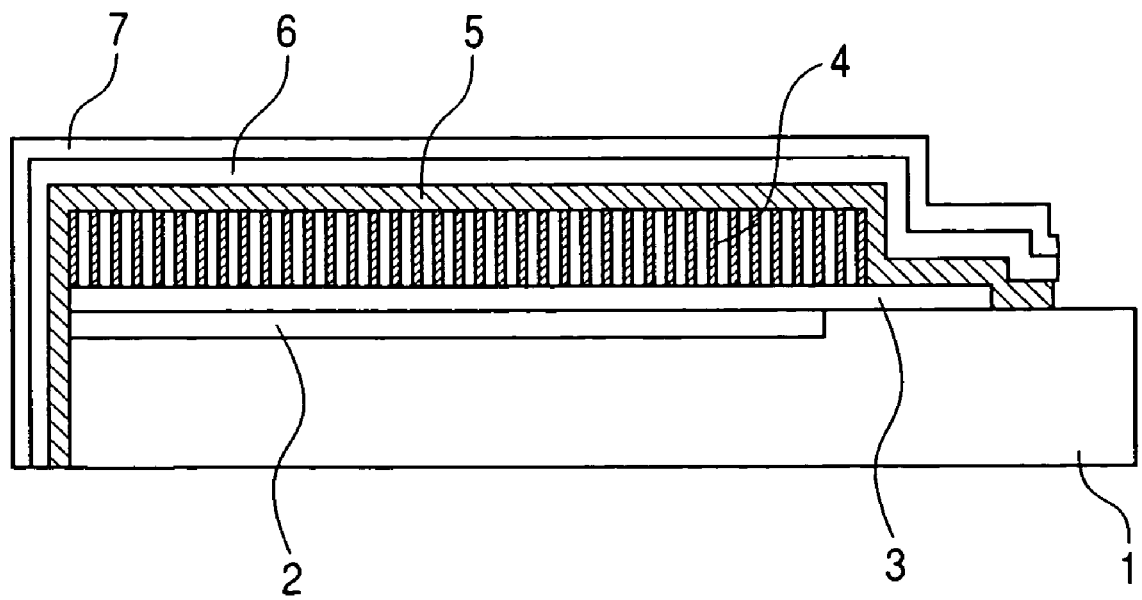
FIG. 10 is a schematic cross sectional view of the radiation detecting apparatus according to the second embodiment of the invention.

FIGS. 9 and 10 are schematic diagrams of a radiation detecting apparatus according to the second embodiment of the invention. In each diagram of each embodiment (the second to eighth embodiments), which will be explained hereinbelow, the sensor protective layer 3b and the phosphor underlying layer 3a are represented by reference numeral 3.

The second embodiment differs from the first embodiment with respect to a point that up to the side surface of the substrate 1 is covered with the phosphor protective layer 5 made of the hot melt resin in order to improve the moisture-proofing effect more than that in the case of the first embodiment. Since only the covering ranges of the phosphor protective layer 5 made of the hot melt resin and the phosphor protective member in FIGS. 9 and 10 differ from those in FIGS. 2 and 5, explanation of the layout, each function, and the like is omitted here. On the side surface of the substrate 1, by executing the hot pressing (heat pressing adhesion) by the hot pressing process to the phosphor protective layer 5 made of the hot melt resin, the moisture-proofing effect can be further improved.

Third Embodiment

Figure 11:
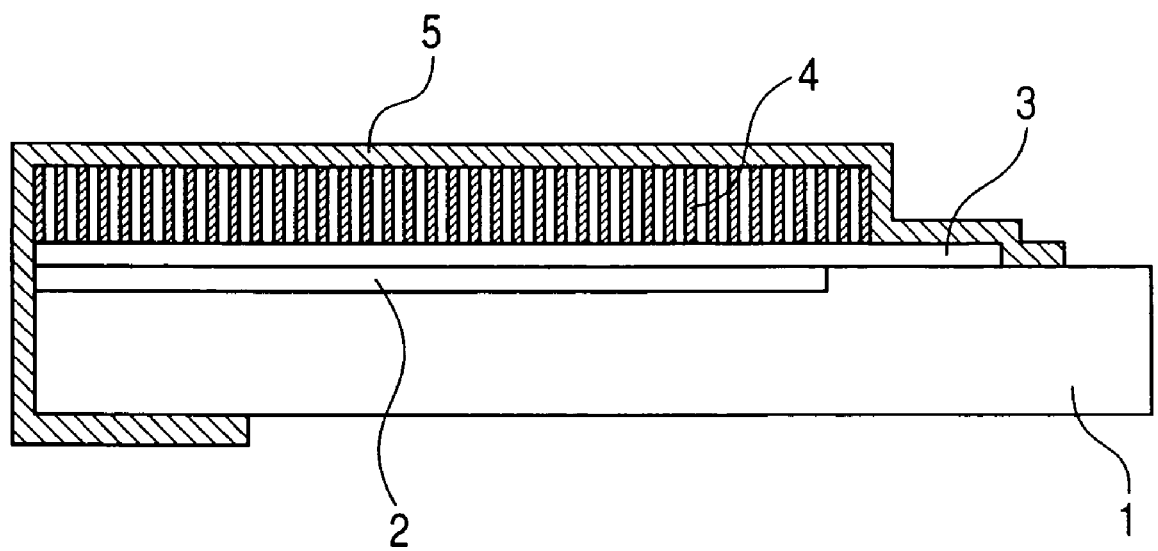
FIG. 11 is a schematic cross sectional view of a radiation detecting apparatus according to the third embodiment of the invention.
Figure 12:
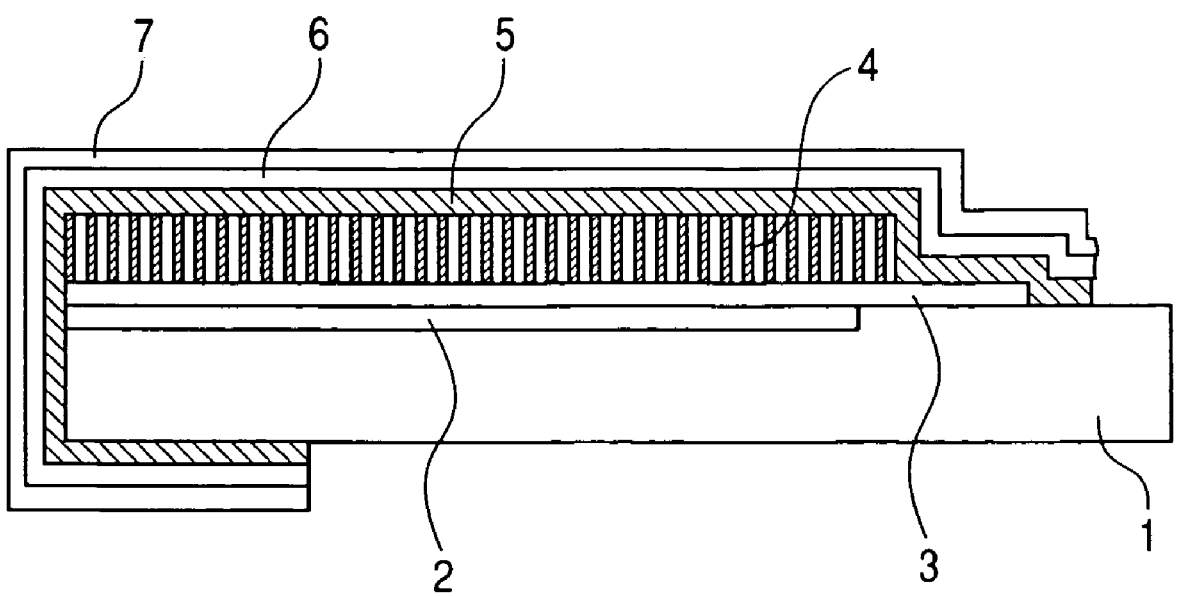
FIG. 12 is a schematic cross sectional view of the radiation detecting apparatus according to the third embodiment of the invention.

FIGS. 11 and 12 show the third embodiment of the invention. The third embodiment differs from the first and second embodiments with respect to a point that up to the back surface of the substrate 1 is covered with a part of the phosphor protective layer 5 made of the hot melt resin.

According to the embodiment, not only the further moisture-proofing effect can be obtained but also there can be obtained such an effect that since the phosphor layer 4 and the side surface of the substrate 1 are perfectly covered, the phosphor protective layer (FIG. 11) and the phosphor protective member (FIG. 12) having the phosphor protective layer, the reflection layer, and the reflection layer protective layer are difficult to be peeled off by the external force can be also obtained.

Fourth Embodiment

Figure 13:
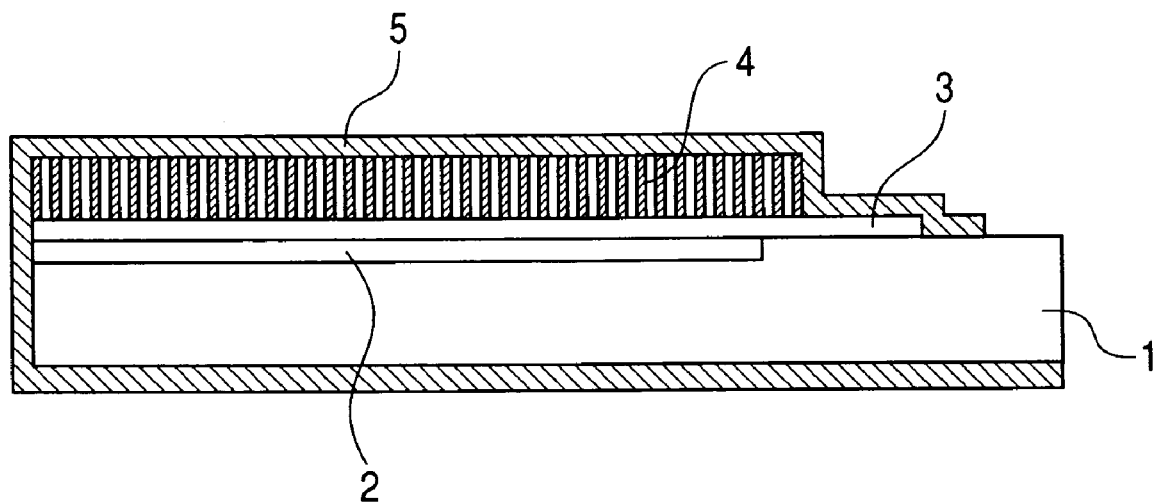
FIG. 13 is a schematic cross sectional view of a radiation detecting apparatus according to the fourth embodiment of the invention.
Figure 14:
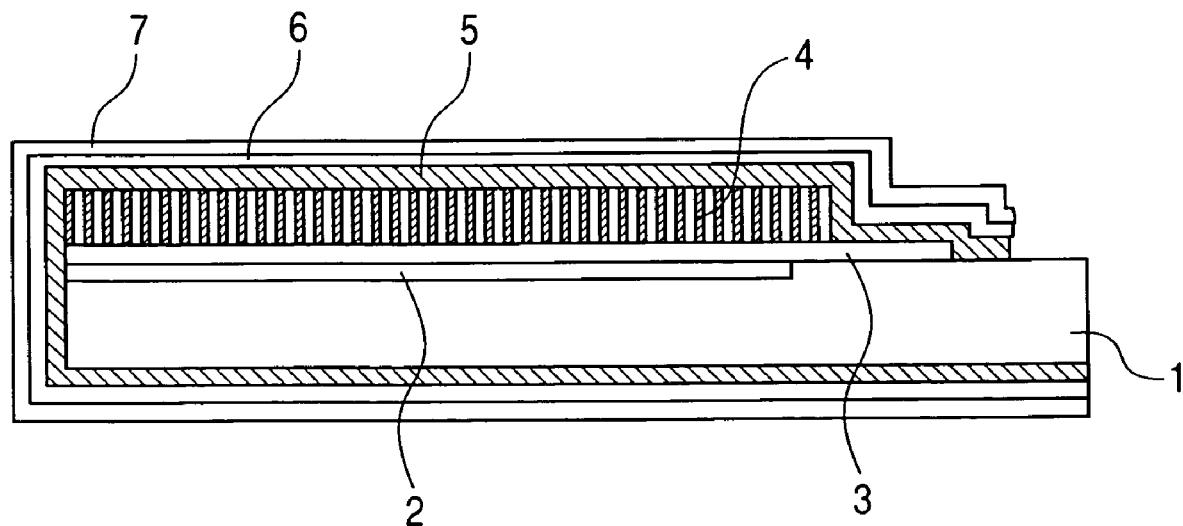
FIG. 14 is a schematic cross sectional view of the radiation detecting apparatus according to the fourth embodiment of the invention.

FIGS. 13 and 14 show the fourth embodiment of the invention. In the fourth embodiment, the back surface of the substrate 1 is completely covered with the phosphor protective layer 5 (FIG. 13) made of the hot melt resin and the phosphor protective member having the phosphor protective layer, the reflection layer, and the reflection layer protective layer.

Thus, not only the moisture-proofing effect is obtained but also the external electromagnetic waves can be prevented by both surfaces of the sensor, so that the more stable radiographing can be performed.

Fifth Embodiment

Figure 15:
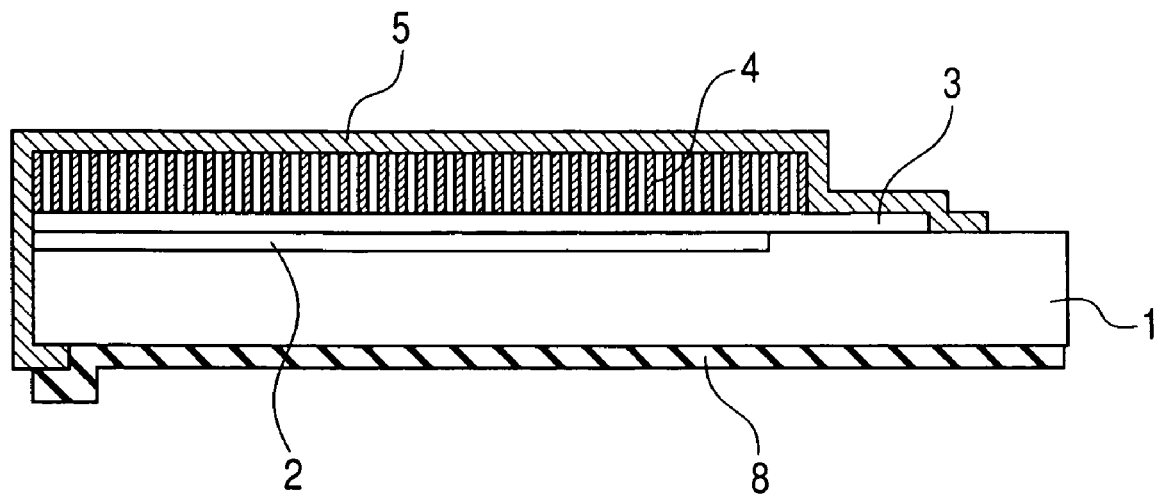
FIG. 15 is a schematic cross sectional view of a radiation detecting apparatus according to the fifth embodiment of the invention.

FIG. 15 shows the fifth embodiment of the invention. In the diagram, reference numeral 8 denotes a hot melt resin layer. The fifth embodiment differs from the construction of FIG. 13 with respect to a point that the different hot melt resin layer 8 is adhered onto the back surface of the substrate 1 separately from the phosphor protective layer 5 made of the hot melt resin which covers the phosphor layer 4. If it is better to separately provide the hot melt resin layer 8 in terms of the manufacturing steps, an effect similar to that of FIG. 13 can be also obtained by the construction of the fifth embodiment. Naturally, an effect similar to that of FIG. 14 can be also obtained by similarly laminating another member comprising the hot melt resin layer, the reflection layer, and the reflection layer protective layer onto the back surface of the substrate 1 separately from the phosphor protective member having the phosphor-protective layer, the reflection layer, and the reflection layer protective layer which covers the phosphor layer 4.

Sixth Embodiment

Figure 16:
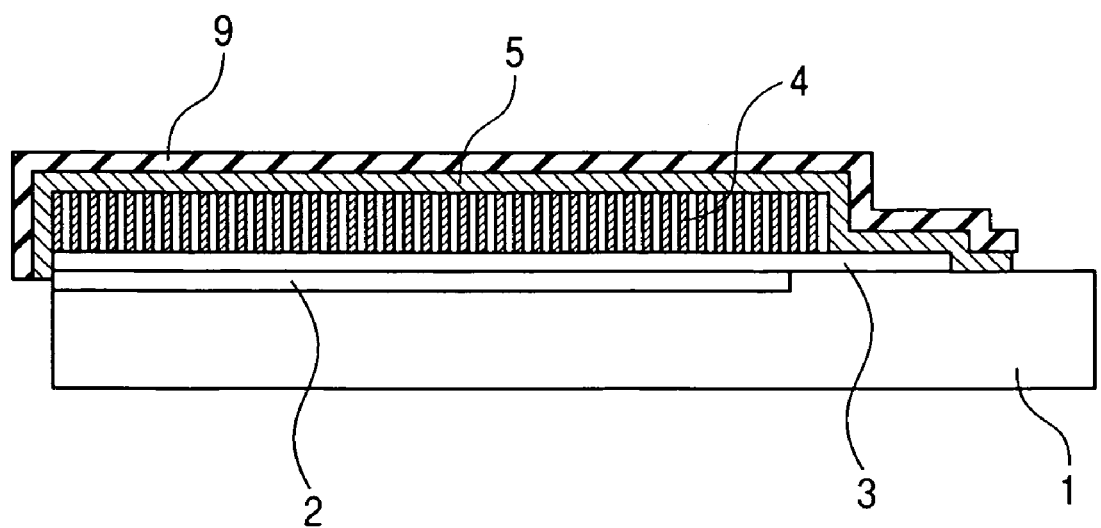
FIG. 16 is a schematic cross sectional view of a radiation detecting apparatus according to the sixth embodiment of the invention.

FIG. 16 shows the sixth embodiment of the invention. In the diagram, reference numeral 9 denotes a second hot melt resin layer. The sixth embodiment relates to a type in which two hot melt layers as phosphor protective layers are used. According to the sixth embodiment, the moisture-proofing effect owing to the construction of the first embodiment shown in FIG. 2 (construction in which the phosphor protective layer is provided up to the side surface of the phosphor underlying layer 3a) is further improved. Naturally, the covering range can be also widened from the phosphor layer 4 to the side surface of the substrate 1 or the back surface of the substrate 1 as in the third and fourth embodiments and the larger moisture-proofing effect can be obtained by such a construction.

The phosphor protective member having the two phosphor protective layers can be also widened from the phosphor layer 4 to the phosphor underlying layer 3a and the side surface of the substrate 1 or the back surface of the substrate 1. The hot melt resins having different characteristics can be used for the two phosphor protective layers. For example, it is desirable that a material having such melting viscosity at which it does not penetrate between the columnar crystalline structures is used for the hot melt resin which is come into contact with the phosphor layer. The improvement in the adhesion is demanded for the hot melt resin which is come into contact with the reflection layer protective layer or the like. When considering the problem such as mechanical destruction such as peel-off or the like, deliquescence of the columnar crystalline phosphor layer due to the penetration of the moisture from the interface, or the like, it is desirable that the coefficient of viscosity of the hot melt resin is lower than the melting viscosity. Therefore, the hot melt resins having different coefficients of melting viscosity can be used.

In each of the embodiments described above, on the side of the sensor substrate having the external connecting terminals, the phosphor protective layer is not formed on the phosphor underlying layer 3a and the side surface of the substrate 1 or the back surface of the substrate 1. However, in the case of the phosphor protective layer in which the external connecting units have previously been hollowed out, the protective layer can be also formed between the external connecting terminals and the side surface or the back surface of the sensor substrate. In this case, it is also possible to first form the phosphor protective layer in which the external connecting terminals have previously been hollowed out on the sensor panel to which the phosphor layer has been evaporation-deposited and, thereafter, form the external connecting terminals.

Seventh Embodiment

Figure 17:
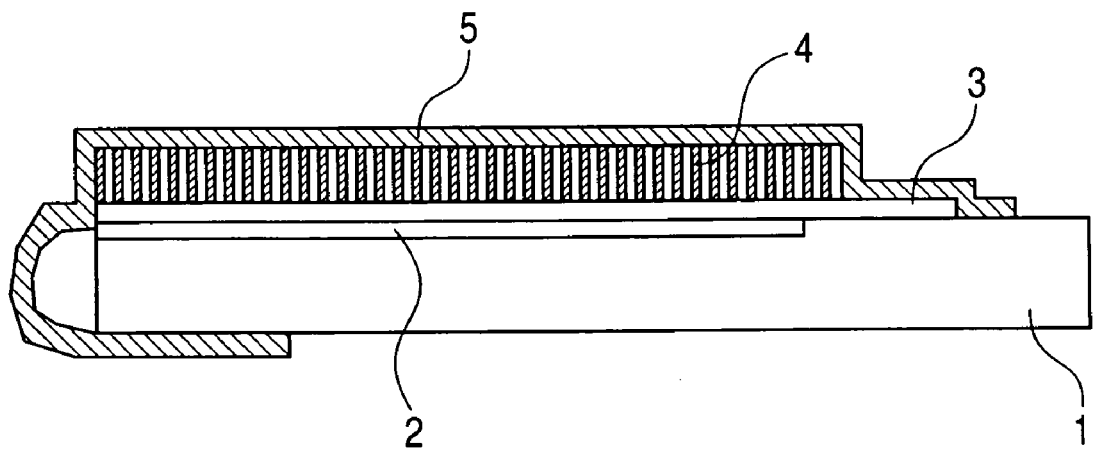
FIG. 17 is a schematic cross sectional view of a radiation detecting apparatus according to the seventh embodiment of the invention.

FIG. 17 shows the seventh embodiment of the invention. The seventh embodiment relates to an example in which the phosphor protective layer 5 of the hot melt resin is allowed to have a slack at the side surface of the sensor panel. Naturally, in the case of arranging the phosphor protective member having the phosphor protective layer, the reflection layer, and the reflection layer protective layer, a slack is also formed at the side surface of the sensor panel. The seventh embodiment relates to an example of a form which is effective in the case of arranging some functional substances to the side surface of the sensor panel.

Figure 18:
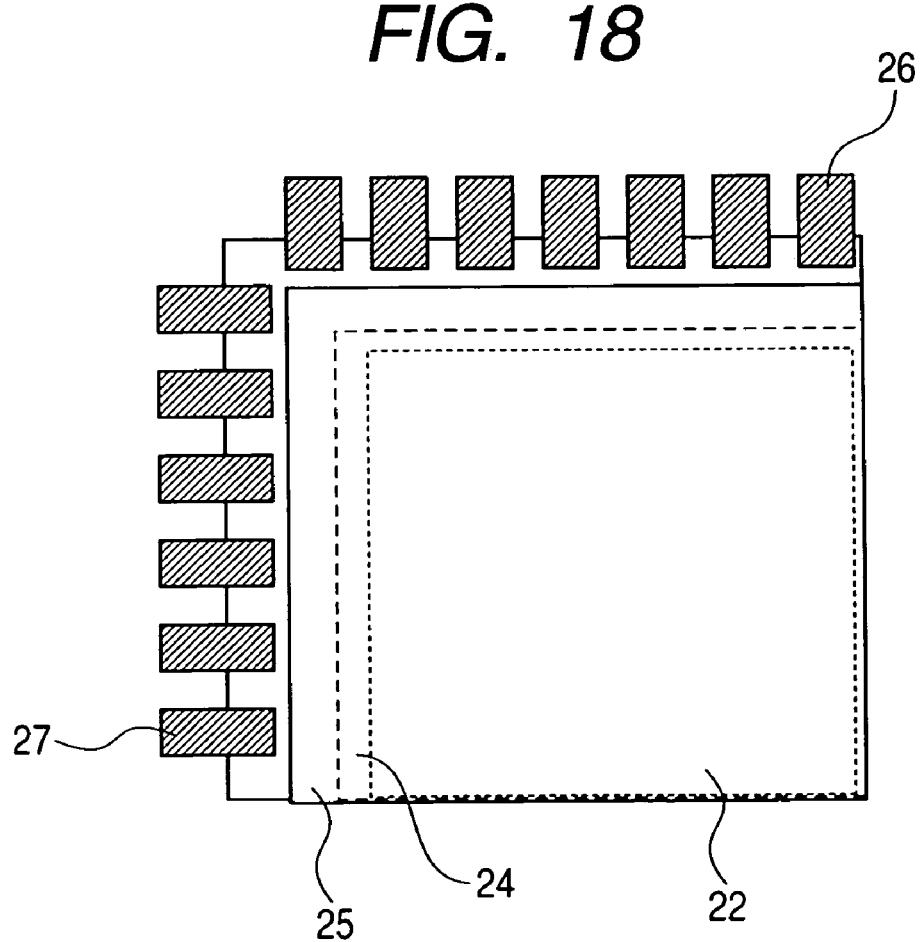
FIG. 18 is a schematic plan view of the radiation detecting apparatus according to the seventh embodiment of the invention.
Figure 19:
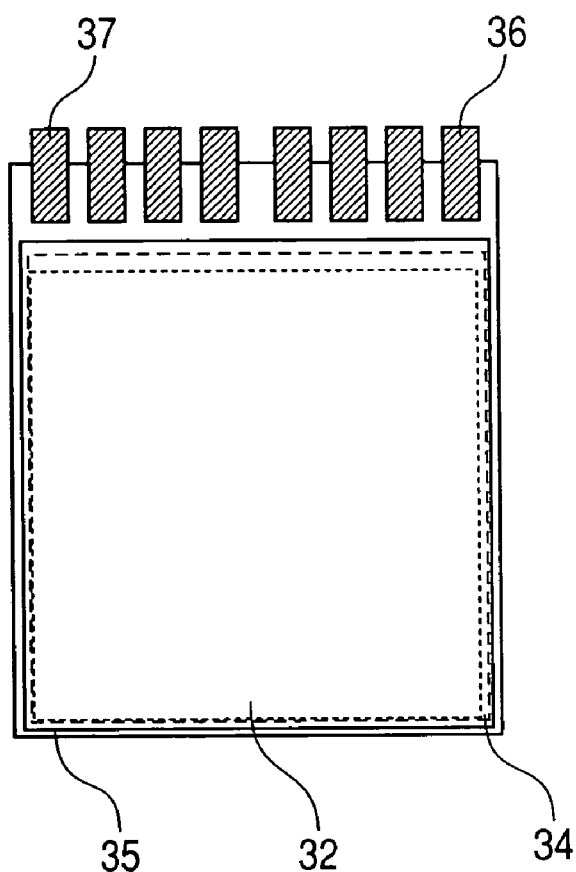
FIG. 19 is a schematic plan view of the radiation detecting apparatus according to the seventh embodiment of the invention.

The radiation detecting apparatus in the form in which the side surface of one side of the quadrilateral sensor panel is covered with the phosphor protective layer as shown in FIG. 1 has been described. However, as shown in FIG. 18 or 19, the similar phosphor protective layer 5 or the similar phosphor protective member having the phosphor protective layer 5, the reflection layer 6, and the reflection layer protective layer 7 can be also arranged on the side surfaces of two sides or the side surfaces of three sides of the quadrilateral sensor panel. In FIG. 18, wiring members 26 each for extracting the electric signal to the outside are arranged to one side and wiring members 27 each for inputting the signal to drive the sensor are arranged to one side and no external connecting units are provided for the other two sides. In FIG. 18, reference numeral 22 denotes a sensor area; 24 a phosphor layer; and 25 a phosphor protective layer. By using the portions without the external connecting units of two sides, the apparatus can be allowed to have a two-dimensional degree of freedom for the patient or affected part.

FIG. 19 shows a form in which the external connecting units are concentrated on one side and the other three sides are made free. In FIG. 19, wiring members 36 each for extracting the electric signal to the outside and wiring members 37 each for inputting the signal to drive the sensor are arranged on one side and no external connecting units are provided for the other three sides. In FIG. 19, reference numeral 32 denotes a sensor area; 34 a phosphor layer; and 35 a phosphor protective layer. The degree of freedom is further increased and a light weight can be accomplished by such a construction. In the case of radiographing the bedridden patient or sitting patient in a sickroom or the like, if the sensor is arranged up to the edge portion of the apparatus, an application range is widened, so that it is very useful.

Figure 20:
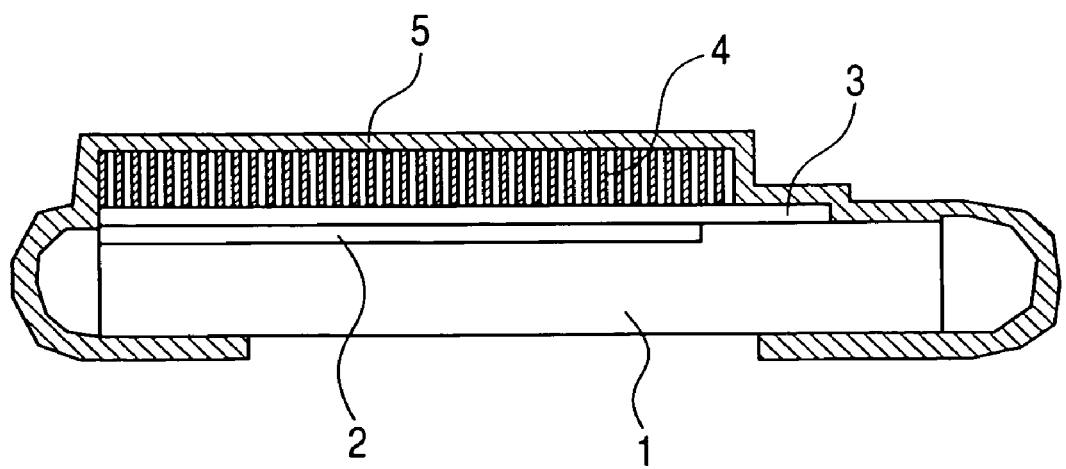
FIG. 20 is a schematic cross sectional view of the radiation detecting apparatus according to the seventh embodiment of the invention.
Figure 21:
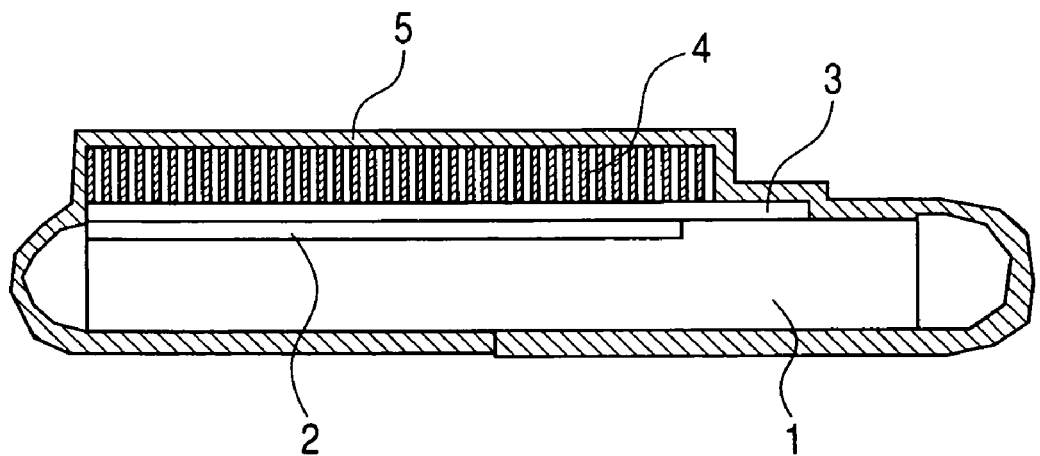
FIG. 21 is a schematic cross sectional view of the radiation detecting apparatus according to the seventh embodiment of the invention.

Constructions shown in FIGS. 20 and 21 relate to application examples of the construction shown in FIG. 17. FIG. 20 shows the case where the phosphor protective layer 5 is formed while also including the external connecting terminal side (right side in the diagram). The phosphor protective member having the phosphor protective layer 5, the reflection layer 6, and the reflection layer protective layer 7 can be also similarly arranged, thereby enabling the electromagnetic shielding to be made to a reading circuit such as an amplifying IC or the like on the external connecting terminal or to a driving circuit such as a driving IC or the like. Further stabilization of the signal can be accomplished. FIG. 21 relates to the form in which the whole back surface of the sensor panel is covered and a radiation detecting apparatus which is hardly influenced by the electromagnetic waves can be similarly accomplished. The external connecting terminal unit 413 can be realized by providing an extracting opening portion for a part of the phosphor protective layer 5, the reflection layer 6, and the reflection layer protective layer 7. If the opening portion at this time is located at a position away from the amplifying IC or the driving IC, the electromagnetic shielding effect is not deteriorated.

A temperature at the time when the phosphor protective layer 5 or the phosphor protective member having the phosphor protective layer 5, the reflection layer 6, and the reflection layer protective layer 7 is adhered onto the sensor panel is set to about a melting temperature of the resin. However, there is a case where small air bubbles are generated upon melting and the adhesion power is partially reduced by the air bubbles. A similar problem also occurs in the periphery of the edge portion of the phosphor protective layer 5 or the phosphor protective member. When the adhesion power decreases, there is such a fear that the moisture penetrates from the interface surface between the hot melt resin and the sensor panel. Thus, since the deliquescence of the phosphor layer having the columnar crystalline structure occurs and causes a deterioration in light emission amount and decomposing characteristics, it is demanded to further improve the adhesion power.

It is an object of the heat sealing of the edge portion of the phosphor protective layer 5 to improve the moisture resistance. Upon heat sealing of the edge portion, the sheet is heated at a temperature which is slightly higher than the melting temperature of the resin and pressurized, thereby sufficiently melting the resin by the heating. Even if the air bubbles are generated, since they are extruded to the outside by the pressurization, the deterioration in adhesion power by the residual air bubbles is prevented. By further thinning the adhesive layer of the edge portion by the pressurization, a moisture penetration route from the outside can be narrowed. As a region where the heat sealing is executed, it is desirable to execute the heat sealing in the outside of the sensor area 2. This is because since a slight step-forming portion in the sensor area exists due to the structure of the sensor portion, there is such a fear that the sufficient reliability and effect of the heat sealing are not obtained due to the influence by the step-forming portion. Therefore, the sufficient reliability and effect can be obtained by executing hot pressing (heat sealing) out of the sensor area without a step-forming portion.

Figure 22:
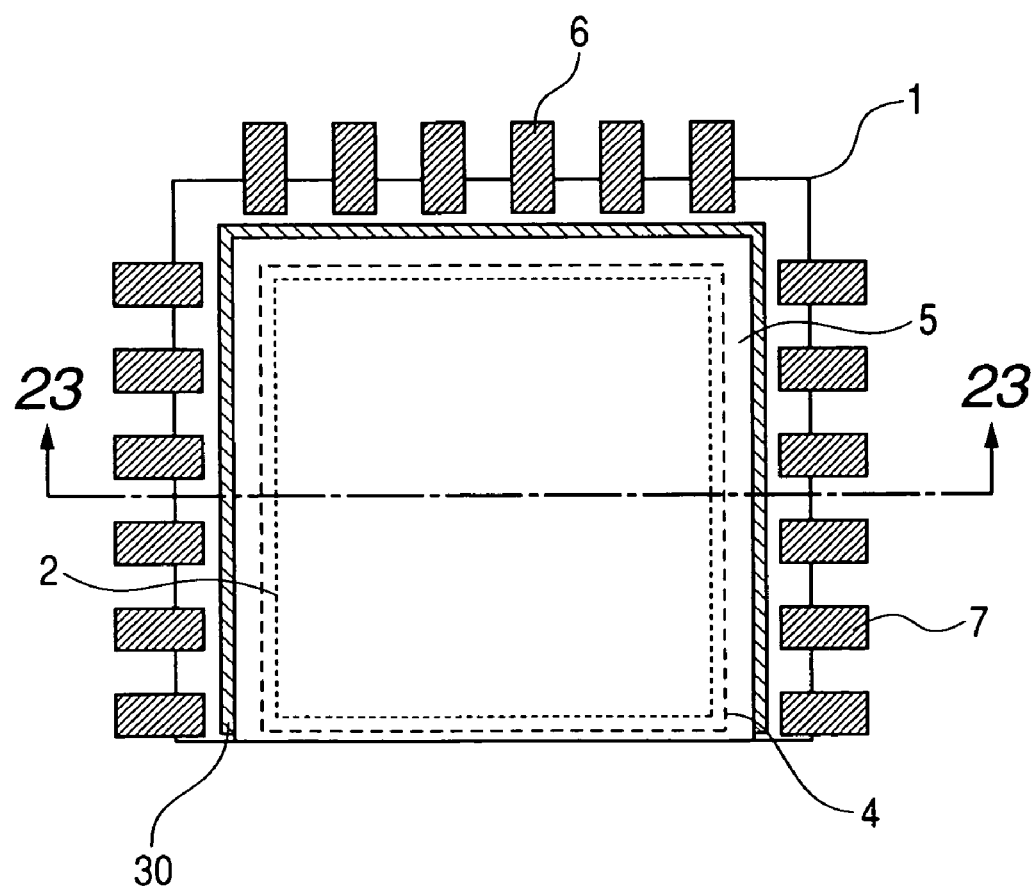
FIG. 22 is a schematic constructional diagram of the radiation detecting apparatus subjected to a hot pressing (heat sealing)
Figure 23:
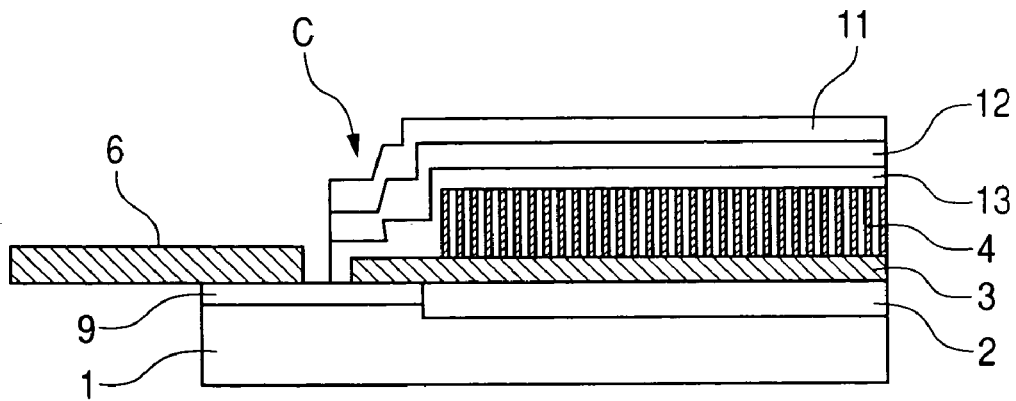
FIG. 23 is a cross sectional view taken along the line 23-23 in FIG. 22.

FIG. 22 shows a schematic constructional diagram of the sensor panel subjected to the hot pressing (heat sealing). In the diagram, reference numeral 30 denotes a hot pressing portion (heat sealing portion) and a thickness of hot melt resin layer is thin. FIG. 23 shows a cross sectional view taken along the line 23-23 in FIG. 22. In FIG. 23, a portion shown by an arrow (C) corresponds to the hot pressing portion (heat sealing portion). By this structure, the moisture-proofing effect can be improved. Naturally, the heat sealing can be applied to all of the embodiments of the invention.

The hot pressing will be further explained with reference to FIGS. 24A to 26B.

Figure 24A:
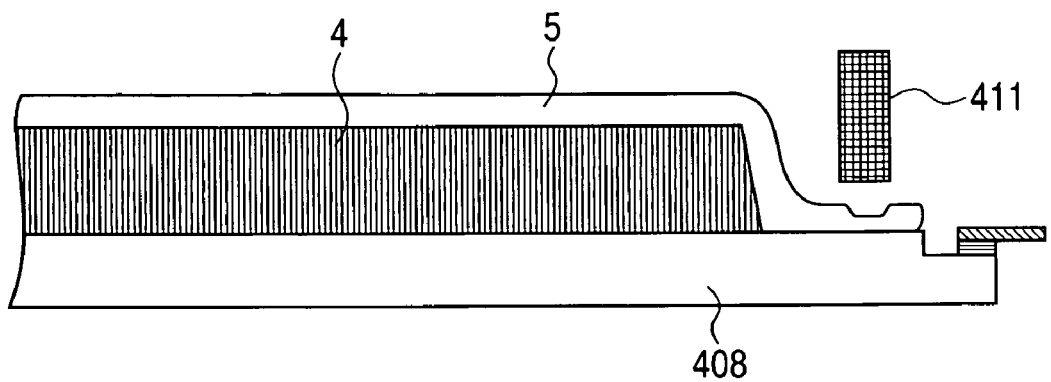
FIGS. 24A and 24B are diagrams for explaining the hot pressing.
Figure 24B:
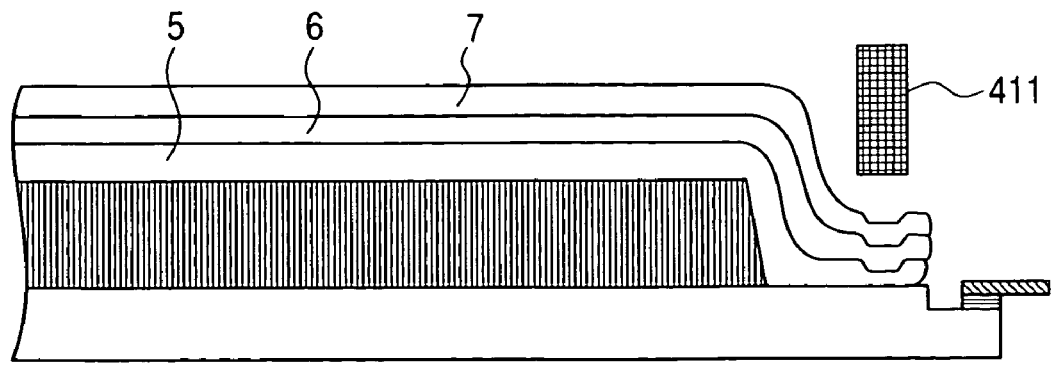

In the hot pressing process, the phosphor protective layer 5 is hot-pressed by heat pressing means 411 as shown in FIG. 24A. After the reflection layer 6 and the reflection layer protective layer 7 are formed, they are further hot-pressed by the heat pressing means 411. Moreover, the phosphor protective layer 5, the reflection layer 6, and the reflection layer protective layer 7 are collectively hot-pressed by the heat pressing means 411 as shown in FIG. 24B. By the above method, the phosphor layer 4 is coated and the phosphor protective layer 5 can be formed.

The hot pressing portion is provided to improve the moisture-proofing performance in the contact interface between the peripheral region of the phosphor layer 4 of the phosphor protective layer 5 made of the hot melt resin and the sensor panel. In the embodiment, in the peripheral portion of the phosphor layer 4, the phosphor protective layer 5 made of the hot melt resin is in contact with the phosphor underlying layer 3a. The hot pressing portion can be provided for a part or all of the peripheral portion of the phosphor protective member. In the embodiment, the hot pressing portions are provided for three sides of the peripheral portion of the phosphor protective layer 5 as shown in FIG. 22. The hot pressing portion is a region which was partially heat-pressing processed and pressure-bonded (adhered by pressurizing) by the heat pressing means 411 (FIGS. 24A and 24B) so that the thickness of hot melt resin is thinner than the other portion.

Figure 25:
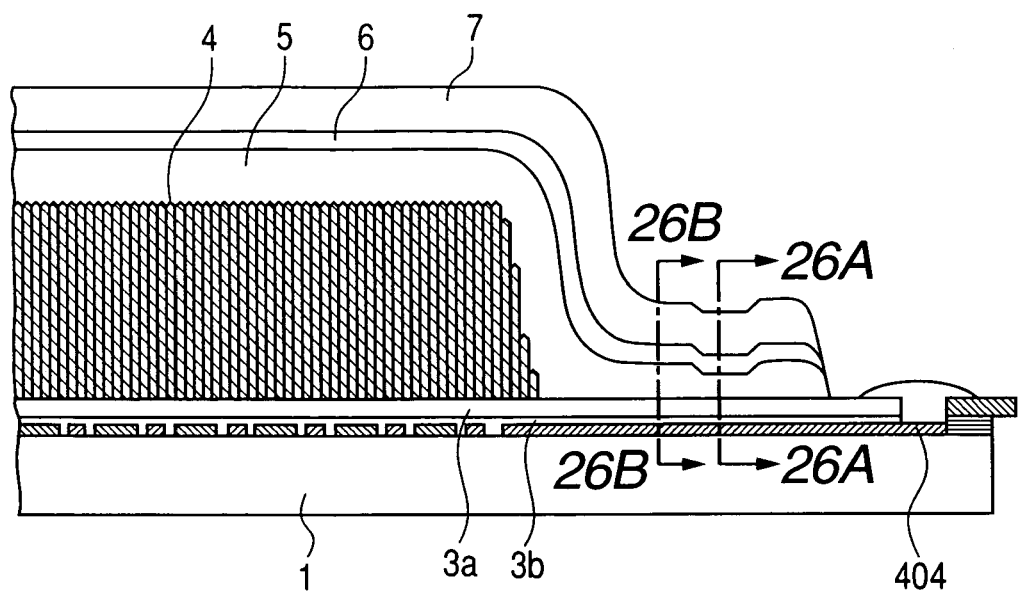
FIG. 25 is a diagram for explaining the hot pressing.
Figure 26A:
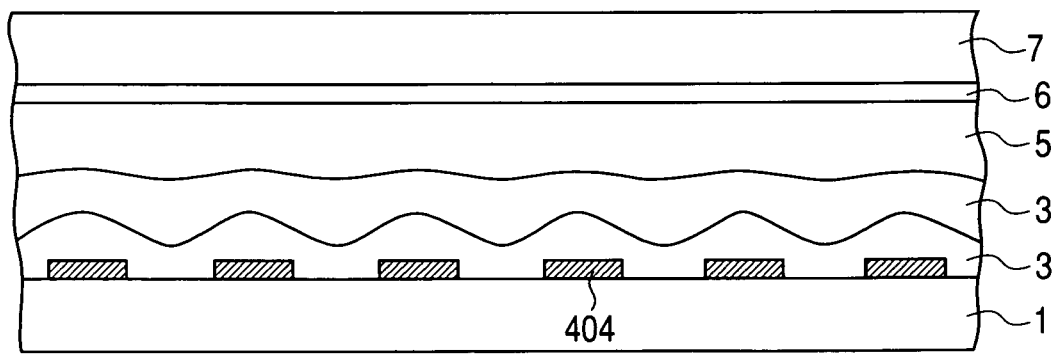
FIGS. 26A and 26B are diagrams for explaining the hot pressing.
Figure 26B:
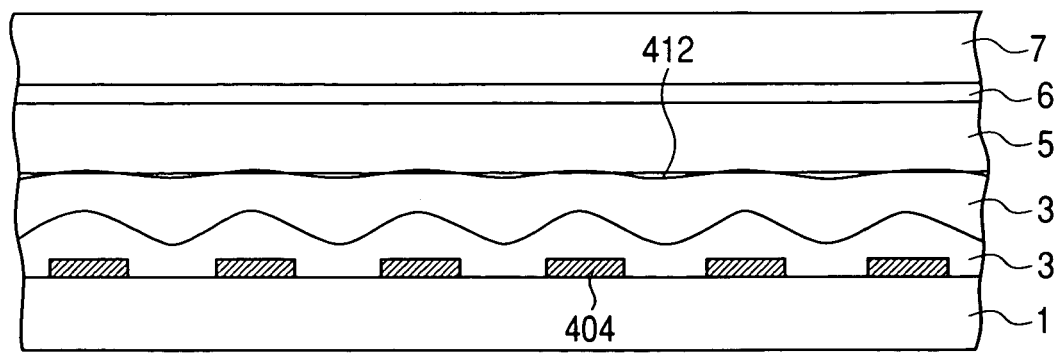

FIG. 26A is a cross sectional view taken along the line 26A-26A in FIG. 25. FIG. 26B is a cross sectional view taken along the line 26B-26B in FIG. 25. Reference numeral 404 denotes the wiring pattern of the electrical connecting unit. In the peripheral region of the phosphor underlying layer 3a where the phosphor layer 4 has been formed, roughness is caused on the surface of the sensor protective layer 3b due to the existence of the wiring pattern 404. Although the phosphor underlying layer 3a functioning as a flat layer is formed to lighten the surface roughness, the surface of the phosphor underlying layer 3a is not completely flat but has slight surface roughness. Even if the phosphor protective layer 5 made of the hot melt resin is formed on such a rough surface, there is a possibility of occurrence of slight gaps 412 as shown in FIG. 26B. That is, in the portion of FIG. 26B showing a cross section where the hot pressing (heat pressing) is not executed, the penetration of the hot melt resin into the rough surface of the wiring pattern 404 is insufficient and there is a case where a gap occurs between the wiring pattern and the hot melt resin. There is a possibility that the following phenomena are caused by the gaps 412.
1) Decrease in adhesion power between the phosphor underlying layer 3a and the phosphor protective layer 5.
2) Deliquescence of the phosphor layer 4 by the moisture in the atmosphere which penetrates from the gaps 412.
3) Deterioration of the moisture-proofing performance of the phosphor protective layer 5.

Therefore, in the region where the phosphor underlying layer 3a is come into contact with the phosphor protective layer 5, by executing the hot pressing process (heat pressing process) by using the heat pressing means 411 so as to surround the region where the phosphor layer 4 has been formed, the hot melt resin melted by the heating penetrates into the concave portions on the surface of the phosphor underlying layer 3a by pressurizing, is hardened by cooling, buries the gaps 412 on the surface of the phosphor underlying layer 3a, and is adhered. In other words, in the portion of FIG. 26A showing the cross section where the hot pressing process has been executed, since the hot melt resin is sufficiently melted, the occurrence of the gaps 412 is suppressed. Thus, the adhesion power is improved and the moisture-proofing performance in the peripheral portion is improved. The hot pressing process is executed, for example, at a pressure of 1 to 10 kg/cm$^2$, at a temperature which is higher than the melting start temperature of the hot melt resin by about 10 to 50° C., and for 1 to 60 seconds.

Although the radiation detecting apparatus of the type in which columnar phosphor has directly evaporation-deposited onto the sensor substrate has been described above, another indirect type in which the phosphor layer having the columnar structure is evaporation-deposited onto the supporting substrate and the supporting substrate is adhered onto the sensor panel is also considered. According to the direct type, when the phosphor layer having the columnar structure is evaporation-deposited onto the expensive sensor panel, if a foreign substance is contained in the phosphor layer or many defects occur, there is a risk that the sensor panel cannot be used. However, according to the indirect laminating type, after the phosphor layer was evaporation-deposited onto the supporting substrate, it is adhered onto the sensor. Therefore, the product is not influenced by the state of the phosphor layer and the sensor panel is not influenced on manufacturing.

Eighth Embodiment

Figure 27:
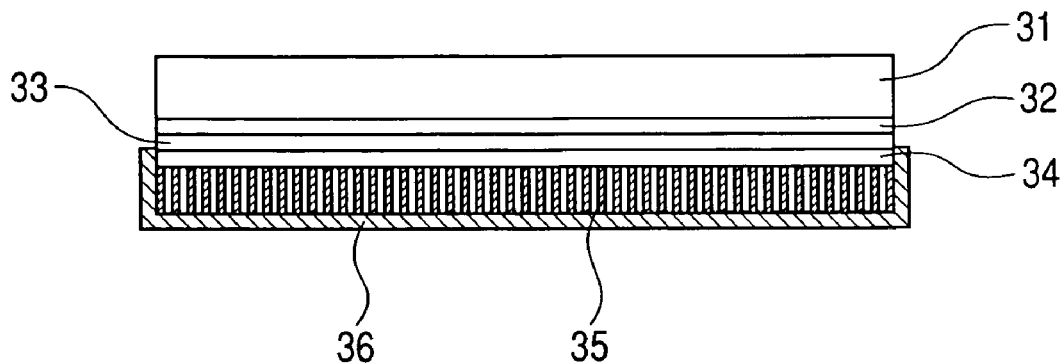
FIG. 27 is a schematic cross sectional view of a radiation detecting apparatus according to the eighth embodiment of the invention.
Figure 28:
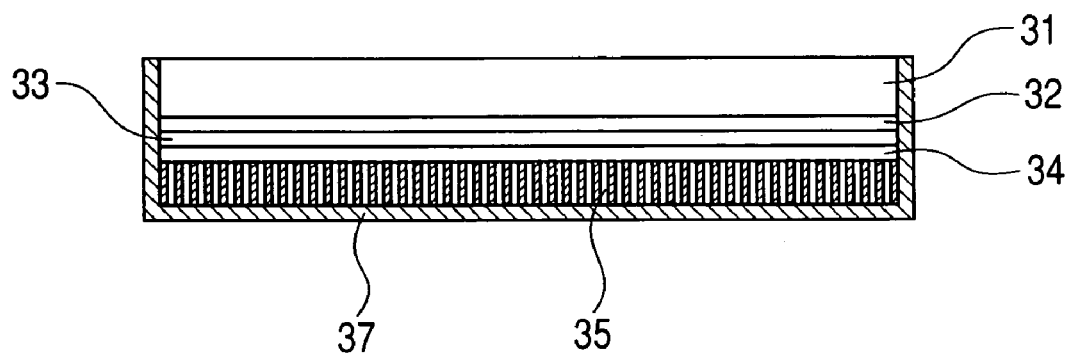
FIG. 28 is a schematic cross sectional view of the radiation detecting apparatus according to the eighth embodiment of the invention.
Figure 29:
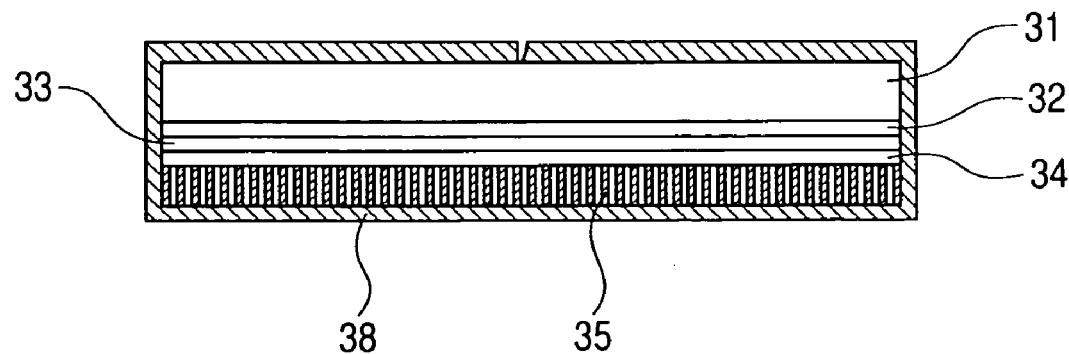
FIG. 29 is a schematic cross sectional view of the radiation detecting apparatus according to the eighth embodiment of the invention.

Each of FIGS. 27, 28, and 29 shows a type in which the phosphor protective layer made of the hot melt resin is formed on a phosphor layer 35 having the columnar crystalline structure which has been evaporation-deposited onto a supporting substrate 31. In those diagrams, forming ranges of the phosphor protective layers are different and their effects have already been described in the foregoing embodiments. Therefore, creation of the protective layer of the indirect (laminating) type will now be described with reference to FIG. 27.

In FIG. 27, reference numeral 31 denotes the supporting substrate; 32 an insulative layer; 33 a reflection layer; 34 a reflection layer protective layer; 35 a phosphor layer having a columnar crystalline structure; and 36 (37 in FIG. 28, 38 in FIG. 29) a phosphor protective layer made of the hot melt resin. A scintillator panel is constructed by the component elements 31 to 36. By arranging the phosphor protective layer 36 made of the hot melt resin onto the sensor panel so that it is come into contact with the sensor surface and heating the sensor panel so that the hot melt resin enters the melting state, the supporting substrate formed with the sensor panel and the phosphor layer can be integrated.

As a supporting substrate 31, it is preferable to use various substrates having radiation permeability such as amorphous carbon substrate, Al substrate, glass substrate, quartz substrate, and the like. As a reflection layer 33, it is preferable to use a metal having high reflectance such as Al, Ag, Cr, Cu, Ni, Ti, Mg, Rh, Pt, Au, or the like. As a reflection layer protective layer (phosphor underlying layer) 34, it is preferable to use a transparent inorganic film of LiF, MgF$_2$, SiO$_2$, Al$_2$O$_3$, TiO$_2$, MgO, or SiN or a transparent organic film of polyimide or the like. As a reflection layer protective layer (phosphor underlying layer) 34, it is preferable to use a nonconductive material in order to prevent electrochemical corrosion from occurring between the reflection layer 33 and the phosphor layer 35. In the case of using the conductive material for the supporting substrate 31 as in the embodiment, it is preferable that an insulative layer is formed between the supporting substrate 31 and the reflection layer 33 in order to prevent the electrochemical corrosion from occurring between the supporting substrate 31 and the reflection layer 33. Although all of the embodiments of the invention have been described on the assumption that a phosphor layer of a columnar structural crystal is used as a phosphor layer, the electromagnetic shielding effect and the moisture-proofing effect are not particularly concerned with the shape, kind, or the like of the phosphor layer. Naturally, even if the phosphor layer formed by a vapor phase depositing method is used, the similar electromagnetic shielding effect and moisture-proofing effect are obtained by the construction of the invention.

Although the embodiments have been described above with respect to the square radiation detecting apparatus, another shape such as rectangle, polygonal shape, disk shape, semicircular shape, elongated shape, or the like can be also used as necessary.

Nine Embodiment

A radiographing system using the radiation detecting apparatus according to the invention will now be described with reference to FIG. 30.

Figure 30:
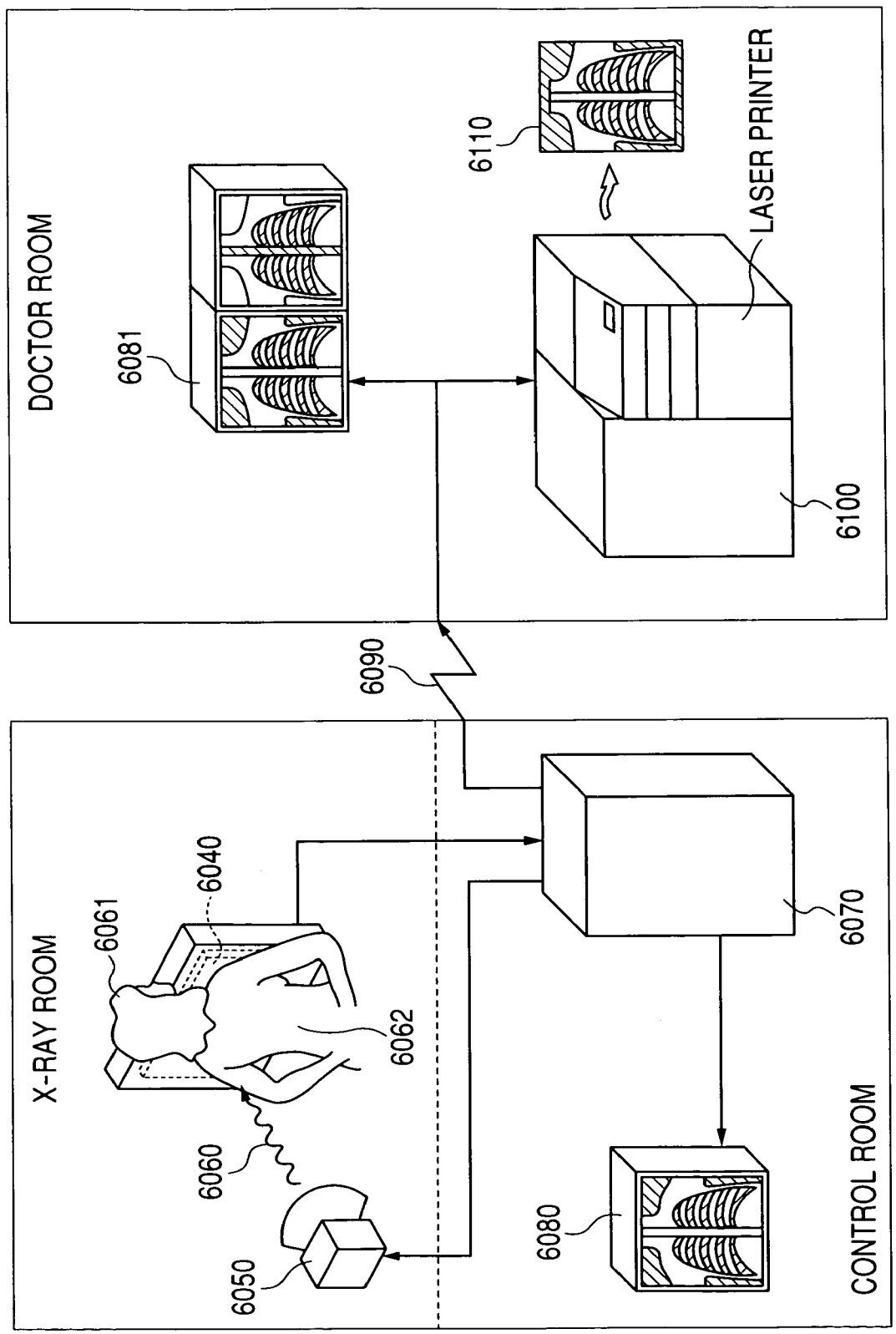
FIG. 30 is a diagram for explaining a radiation detecting system using the radiation detecting apparatus according to the invention.
Figure 31:
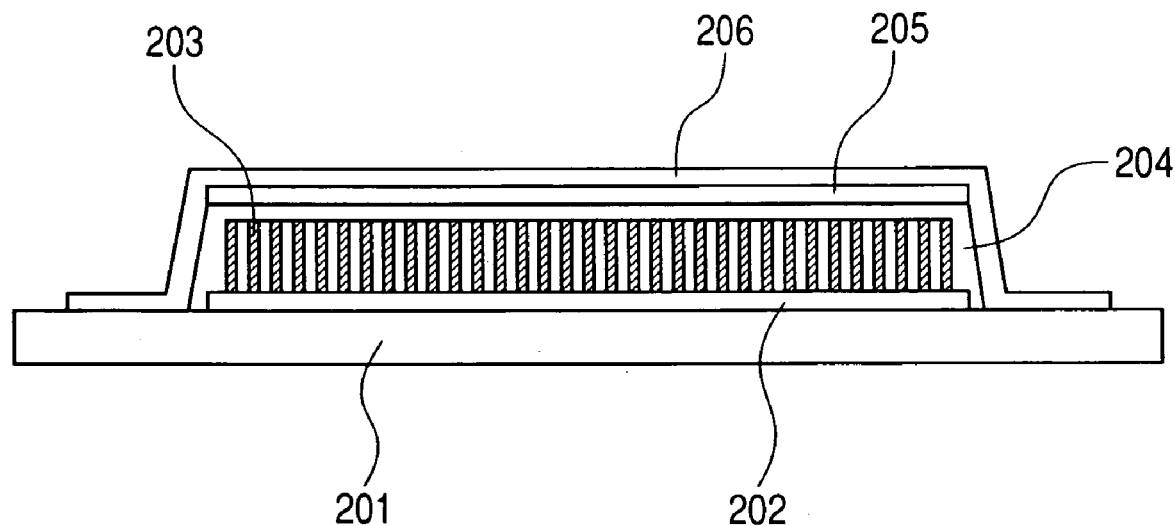
FIG. 31 is a schematic cross sectional view of a conventional radiation detecting apparatus.
Figure 32:
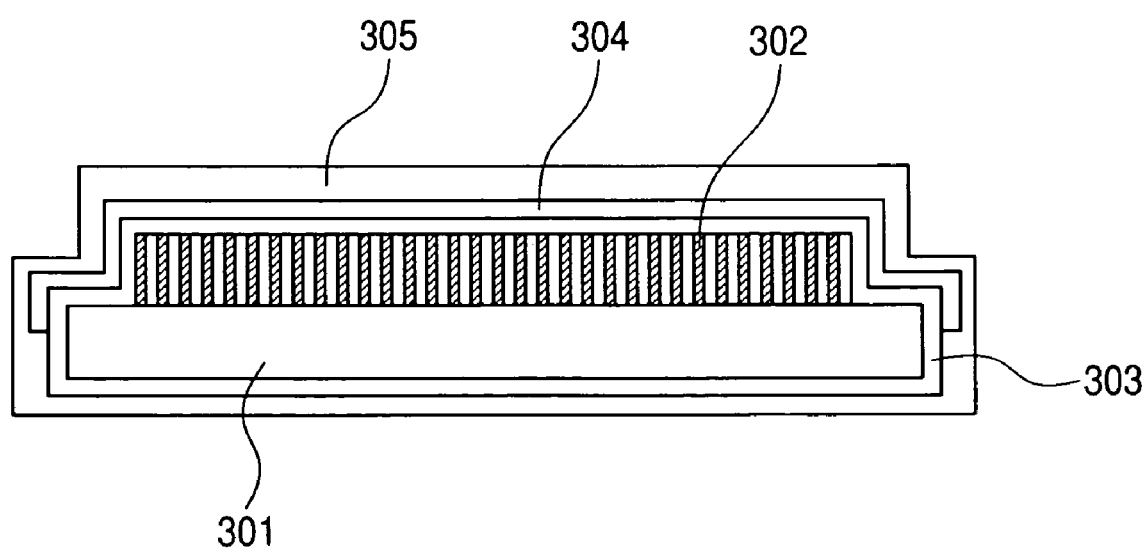
FIG. 32 is a schematic cross sectional view of a conventional radiation detecting apparatus.

As shown in FIG. 30, an X-ray 6060 generated by an X-ray tube 6050 transmits a chest region 6062 of a patient or subject 6061 and enters a radiation detecting apparatus 6040. Information of an internal of the body of the patient 6061 is included in the incident X-ray. The phosphor of the radiation detecting apparatus 6040 emits light in correspondence to the incidence of the X-ray. The emitted light is photoelectrically converted, thereby obtaining electric information. The information is converted into a digital signal and image-processed by an image processor 6070 so that the user can observe the obtained image by a display 6080 in a control room.

The information can be transferred to a remote place by transmitting means such as a telephone line 6090 or the like, displayed onto a display 6081 in a doctor room or the like at another place, or stored in storing means such as an optical disk or the like. A doctor at a remote place can diagnose the patient. The image can be also recorded to a film 6110 by a film processor 6100.

The invention is used for a radiation detecting apparatus or a scintillator panel which is used in a medical diagnosing apparatus, a non-destructive inspecting apparatus, or the like.

This application claims priority from Japanese Patent Application No. 2004-233424 filed Aug. 10, 2004, which is hereby incorporated by reference herein.

What is claimed is:

1. A radiation detecting apparatus comprising:
   a substrate;
   a phosphor layer which is arranged on a principal plane of said substrate and converts a wavelength of a radiation; and
   a phosphor protective layer which covers said phosphor layer and is adhered to said substrate,
   wherein said phosphor protective layer is made of a hot melt resin and arranged so as to cover an upper surface and a side surface of said phosphor layer, and wherein said phosphor protective layer has a portion of which thickness is made smaller by a pressing adhesion process at a peripheral region of said phosphor layer.

2. An apparatus according to claim 1, wherein at least up to a side surface of a phosphor underlying layer provided on the surface of said substrate is covered with said phosphor protective layer.

3. An apparatus according to claim 1, wherein at least a part of the other principal plane which faces one principal plane of said substrate formed with said phosphor layer is further covered with said phosphor protective layer.

4. An apparatus according to claim 1, wherein said substrate is a sensor panel comprising:
   a base material;
   a photoreceiving unit constructed by a plurality of photoelectric conversion elements which are two-dimensionally arranged on said base material and convert light converted by said phosphor layer into electric signals; and
   a protective layer which is provided over said photoreceiving unit and comes into contact with said phosphor layer and said phosphor protective layer.

5. An apparatus according to claim 4, further comprising:
   a reflection layer provided on said phosphor protective layer; and
   a reflection layer protective layer provided on said reflection layer.

6. An apparatus according to claim 5, wherein said reflection layer is connected to the ground.

7. An apparatus according to claim 4, wherein said sensor panel has an external connecting terminal unit to extract said electric signal in its edge portion and said phosphor protective layer is arranged in a region where said external connecting terminal unit does not exist.

8. An apparatus according to claim 1, wherein said substrate has a supporting member comprising:
   a supporting substrate;
   a reflection layer which is provided on said supporting substrate and reflects light converted by said phosphor layer; and
   a phosphor underlying layer which is provided on said reflection layer and comes into contact with said reflection layer and said phosphor protective layer,
   and said phosphor layer is provided on said supporting member.

9. An apparatus according to claim 1, wherein said phosphor protective layer has a region where it is pressure-bonded to said substrate by a heat pressing process in a region where it comes into contact with said substrate.

10. An apparatus according to claim 1, wherein said phosphor protective layer has a region where it is pressure-bonded to said substrate by a heat pressing process in a region where it comes into contact with the side surface of said substrate.

11. An apparatus according to claim 1, wherein said hot melt resin contains a resin of a polyolefin system, a polyester system, or a polyamide system as a main component.

12. An apparatus according to claim 1, wherein said phosphor layer has a columnar crystalline structure.

13. An apparatus according to claim 1, wherein said phosphor protective layer is constructed by a plurality of layers.

14. A radiographing system comprising:
   a radiation detecting apparatus according to claim 1;
   a signal processing unit adapted to process a signal from said radiation detecting apparatus;
   a recording unit adapted to record a signal from said signal processing unit;
   a display unit adapted to display the signal from said signal processing unit;
   a transmission processing unit adapted to transmit the signal from said signal processing unit; and
   a radiation source adapted to generate said radiation.

15. A scintillator panel comprising:
   a supporting member;

a phosphor layer which is arranged on said supporting member and converts a wavelength of a radiation; and a phosphor protective layer which covers said phosphor layer and is adhered to said supporting member, wherein said phosphor protective layer is made of a hot melt resin and is arranged so as to cover an upper surface and a side surface of said phosphor layer, and wherein said phosphor protective layer has a portion of which thickness is made smaller by a pressing adhesion process at a peripheral region of said phosphor layer.

16. A panel according to claim 15, wherein at least up to a side surface of a phosphor underlying layer provided on the surface of said supporting member is covered with said phosphor protective layer.

17. A panel according to claim 15, wherein at least a part of the other principal plane which faces one principal plane of said supporting member formed with said phosphor layer is further covered with said phosphor protective layer.

18. A panel according to claim 15, wherein said phosphor protective layer has a region where it is pressure-bonded by a heat pressing process in a region where it comes into contact with said supporting member.

19. A panel according to claim 15, wherein said phosphor protective layer has a region where it is pressure-bonded by a heat pressing process in a region where it comes into contact with the side surface of said supporting member.

20. A panel according to claim 15, wherein said hot melt resin contains a resin of a polyolefin system, a polyester system, or a polyamide system as a main component.

21. A panel according to claim 15, wherein said phosphor layer has a columnar crystalline structure.

22. A panel according to claim 15, wherein said phosphor protective layer is constructed by a plurality of layers.

* * * * *

UNITED STATES PATENT AND TRADEMARK OFFICE
CERTIFICATE OF CORRECTION

| | |
|---|---|
| PATENT NO. | : 7,256,404 B2 |
| APPLICATION NO. | : 11/200025 |
| DATED | : August 14, 2007 |
| INVENTOR(S) | : Masato Inoue et al. |

It is certified that error appears in the above-identified patent and that said Letters Patent is hereby corrected as shown below:

<u>COLUMN 4</u>:

Line 8, "DEPRESSURRING" should read --DEPRESSURIZING--.

<u>COLUMN 8</u>:

Line 67, "Thomas." should read --Thomas--.

<u>COLUMN 18</u>:

Line 23, "phosphor-protective" should read --phosphor protective--.

<u>COLUMN 23</u>:

Line 15, "Nine" should read --Ninth--.

Signed and Sealed this

Twenty-ninth Day of April, 2008

JON W. DUDAS
*Director of the United States Patent and Trademark Office*